United States Patent
Zhang et al.

(10) Patent No.: US 11,800,551 B2
(45) Date of Patent: Oct. 24, 2023

(54) PHASE TRACKING REFERENCE SIGNAL INSERTION WITH HIGHER-RANK SINGLE-CARRIER WAVEFORM

(71) Applicant: QUALCOMM Incorporated, San Diego, CA (US)

(72) Inventors: Xiaoxia Zhang, San Diego, CA (US); Jun Ma, San Diego, CA (US); Morteza Soltani, San Diego, CA (US); Jing Sun, San Diego, CA (US); Iyab Issam Sakhnini, San Diego, CA (US); Tao Luo, San Diego, CA (US); Hemant Saggar, Irvine, CA (US)

(73) Assignee: QUALCOMM Incorporated, San Diego, CA (US)

( * ) Notice: Subject to any disclaimer, the term of this patent is extended or adjusted under 35 U.S.C. 154(b) by 126 days.

(21) Appl. No.: 17/375,610

(22) Filed: Jul. 14, 2021

(65) Prior Publication Data

US 2023/0016516 A1    Jan. 19, 2023

(51) Int. Cl.
*H04W 72/12* (2023.01)
*H04L 5/00* (2006.01)
(Continued)

(52) U.S. Cl.
CPC ......... *H04W 72/542* (2023.01); *H04L 5/0048* (2013.01); *H04W 72/1268* (2013.01)

(58) Field of Classification Search
None
See application file for complete search history.

(56) References Cited

U.S. PATENT DOCUMENTS 10,355,842 B2    7/2019  Lee et al.
2017/0302352 A1*  10/2017  Islam ............... H04B 7/0626
(Continued)

FOREIGN PATENT DOCUMENTS

WO    2021107090 A1    6/2021

OTHER PUBLICATIONS

Ericsson: "Feature Lead Summary 3 of PT-RS", 3GPP TSG RAN WG1 Meeting #92, R1-1803384, Feature Lead Summary 3 on PTRS_V3, 3rd Generation Partnership Project, Mobile Competence Centre, 650, Route Des Lucioles, F-06921, Sophia-Antipolis Cedex, France, vol. RAN WG1. No. Athens, Greece, Feb. 26, 2018-Feb. 30, 2018, Mar. 1, 2018, pp. 1-12, XP051398617, Section 1.2, pp. 6,8.
(Continued)

*Primary Examiner* — Sai Aung
(74) *Attorney, Agent, or Firm* — Procopio, Cory, Hargreaves & Savitch LLP

(57) ABSTRACT

The apparatus may be a device at a UE or a base station. The UE (or base station) may be configured to measure a phase noise of a first local oscillator associated with a first port. The UE (or base station) may further be configured to configure, based on the measured phase noise, an allocation of a first set of one or more REs of a PUSCH (or PDSCH) for at least one PT-RS associated with the first port. The first set of one or more REs may include multiple layers associated with a multiple-layer single-carrier waveform transmission. The UE (or base station) may also be configured to transmit, to a base station (or a UE), the PUSCH (or PDSCH) including the at least one PT-RS, the at least one PT-RS being transmitted via the configured allocation of the first set of one.

28 Claims, 14 Drawing Sheets

(51) Int. Cl.
*H04W 72/542* (2023.01)
*H04W 72/1268* (2023.01)

(56) References Cited

U.S. PATENT DOCUMENTS

| | | | |
|---|---|---|---|
| 2018/0205528 A1* | 7/2018 | Bai | H04L 5/0005 |
| 2019/0173546 A1* | 6/2019 | Kim | H04B 7/0617 |
| 2019/0230688 A1* | 7/2019 | Huang | H04W 72/23 |
| 2019/0356463 A1* | 11/2019 | Zhang | H04W 80/08 |
| 2020/0162303 A1* | 5/2020 | Kim | H04L 5/0094 |
| 2020/0252184 A1* | 8/2020 | Kundargi | H04B 7/0626 |
| 2023/0006794 A1* | 1/2023 | Tervo | H04B 7/0413 |
| 2023/0007513 A1* | 1/2023 | Babaei | H04W 24/08 |

OTHER PUBLICATIONS

Huawei, et al., "Further Details for PT-RS Design", 3GPP TSG RAN WG1 Meeting Ad Hoc for NR, R1-1700073, 3rd Generation Partnership Project, Mobile Competence Centre, 650, Route Des Lucioles, F-06921 Sophia-Antipolis Cedex, France, vol. RAN WG1, No. Spokane, USA, Jan. 16, 2017-Jan. 20, 2017, 5 Pages, Jan. 9, 2017, XP051202499, sections 1, 3.
International Search Report and Written Opinion—PCT/US2022/033207—ISA/EPO—dated Sep. 20, 2022.

* cited by examiner

PHASE TRACKING REFERENCE SIGNAL INSERTION WITH HIGHER-RANK SINGLE-CARRIER WAVEFORM

TECHNICAL FIELD

The present disclosure relates generally to communication systems, and more particularly, to a phase tracking reference signal (PT-RS) for a multi-layer single carrier waveform.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In some aspect of wireless communications, e.g., 5G NR, PT-RS may be used to track and correct phase errors of one or more received symbols (e.g., in millimeter wave (mmW) systems). Phase errors may be caused by one or more of phase noise, carrier frequency offset, and/or Doppler effect. Phase noise may take the form of rapid random fluctuations in the phase of a waveform that may be caused by jitter of an oscillator in a wireless link. Phase noise may have a large impact on high frequency (e.g., mmW) systems. In some aspects, the large impact of phase noise may be due to hardware that is less accurate and/or stable compared to lower-frequency systems. For a cyclic prefix (CP) orthogonal frequency division multiplexing (OFDM) (CP-OFDM) waveform, one or two ports may be associated with a PT-RS, while for a single-carrier discrete Fourier transform spread (DFT-s) OFDM (DFT-s-OFDM) waveform, one port may be associated with a PT-RS. As multi-layer and multi-port single-carrier (e.g., DFT-s-OFDM) waveforms may be used for high-frequency systems, there may be benefit to associating multiple layers and/or multiple ports of a single carrier waveform with a PT-RS.

In an aspect of the disclosure, a method, a computer-readable medium, and an apparatus are provided. The apparatus may be a device at a user equipment (UE). The device may be a processor and/or modem at a UE or the UE itself. The UE may be configured to measure a phase noise of a first local oscillator associated with a first port. The UE may further be configured to configure, based on the measured phase noise, an allocation of a first set of one or more resource elements (REs) of a physical uplink shared channel (PUSCH) for at least one PT-RS associated with the first port. The first set of one or more REs may include multiple layers associated with a multiple-layer single-carrier waveform transmission. The UE may also be configured to transmit, to a base station, the PUSCH including the at least one PT-RS, the at least one PT-RS being transmitted via the configured allocation of the first set of one or more REs.

The apparatus may be a device at a base station. The device may be a processor and/or modem at a base station or the base station itself. The base station may be configured to measure a phase noise of a first local oscillator associated with a first port. The base station may further be configured to configure, based on the measured phase noise, an allocation of a first set of one or more REs of a physical downlink shared channel (PDSCH) for at least one PT-RS associated with the first port. The first set of one or more REs may include multiple layers associated with a multiple-layer single-carrier waveform transmission. The base station may also be configured to transmit, to a UE, the PDSCH including the at least one PT-RS, the at least one PT-RS being transmitted via the configured allocation of the first set of one or more REs.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
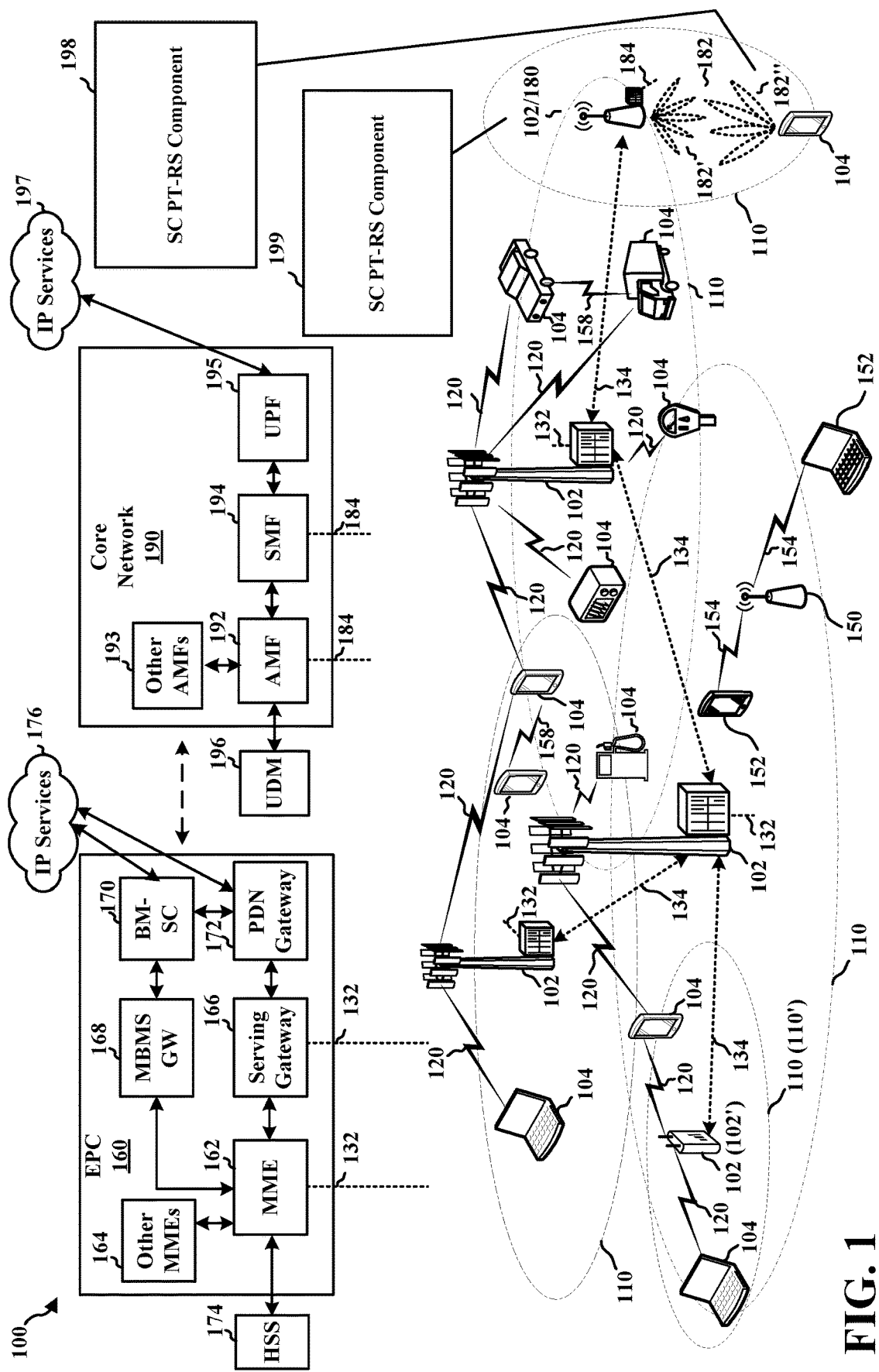
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a single carrier (SC) PT-RS component 198 that may be configured to measure a phase noise of a first local oscillator associated with a first port. The SC PT-RS component 198 may further be configured to configure, based on the measured phase noise, an allocation of a first set of REs of a PUSCH for at least one PT-RS associated with the first port, where the first set of REs may include multiple layers associated with a multiple-layer SC waveform transmission. The SC PT-RS component 198 may also be configured to transmit, to a base station, the PUSCH including the at least one PT-RS, where the at least one PT-RS may be transmitted via the configured allocation of the first set of REs. In certain aspects, the base station 180 may include a SC PT-RS component 199 that may be configured to measure a phase noise of a first local oscillator associated with a first port. The SC PT-RS component 199 may further be configured to configure, based on the measured phase noise, an allocation of a first set of REs of a PDSCH for at least one PT-RS associated with the first port, where the first set of REs may include multiple layers associated with a multiple-layer single-carrier waveform transmission. The SC PT-RS component 199 may also be configured to transmit, to a UE, the PDSCH including the at least one PT-RS, where the at least one PT-RS may be transmitted via the configured allocation of the first set of REs. Although the following description may be focused on 5G NR, the concepts described herein may be applicable to other similar areas, such as LTE, LTE-A, CDMA, GSM, and other wireless technologies.

Figure 2:
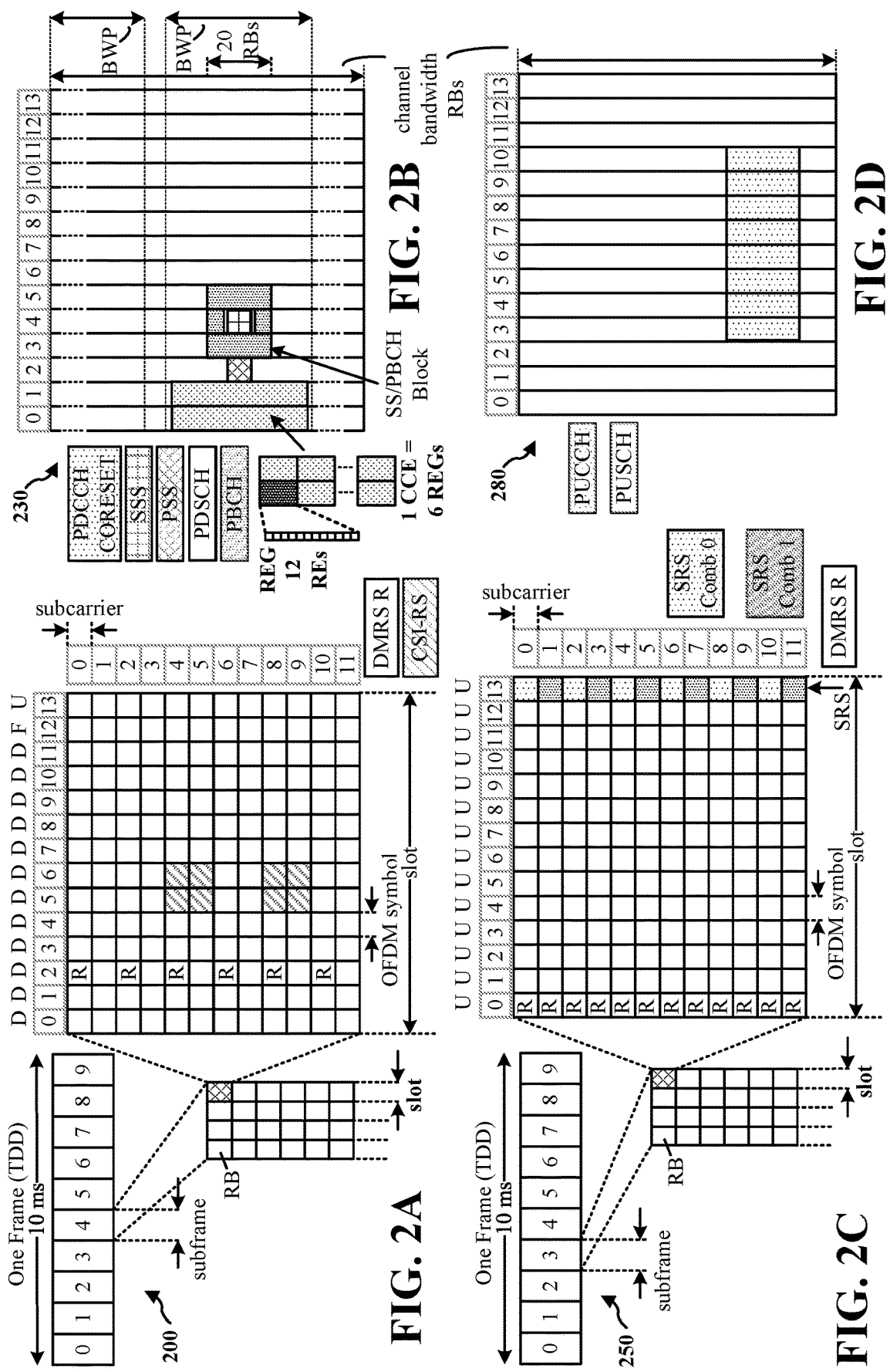
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS $\Delta f = 2^\mu \cdot 15 [kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
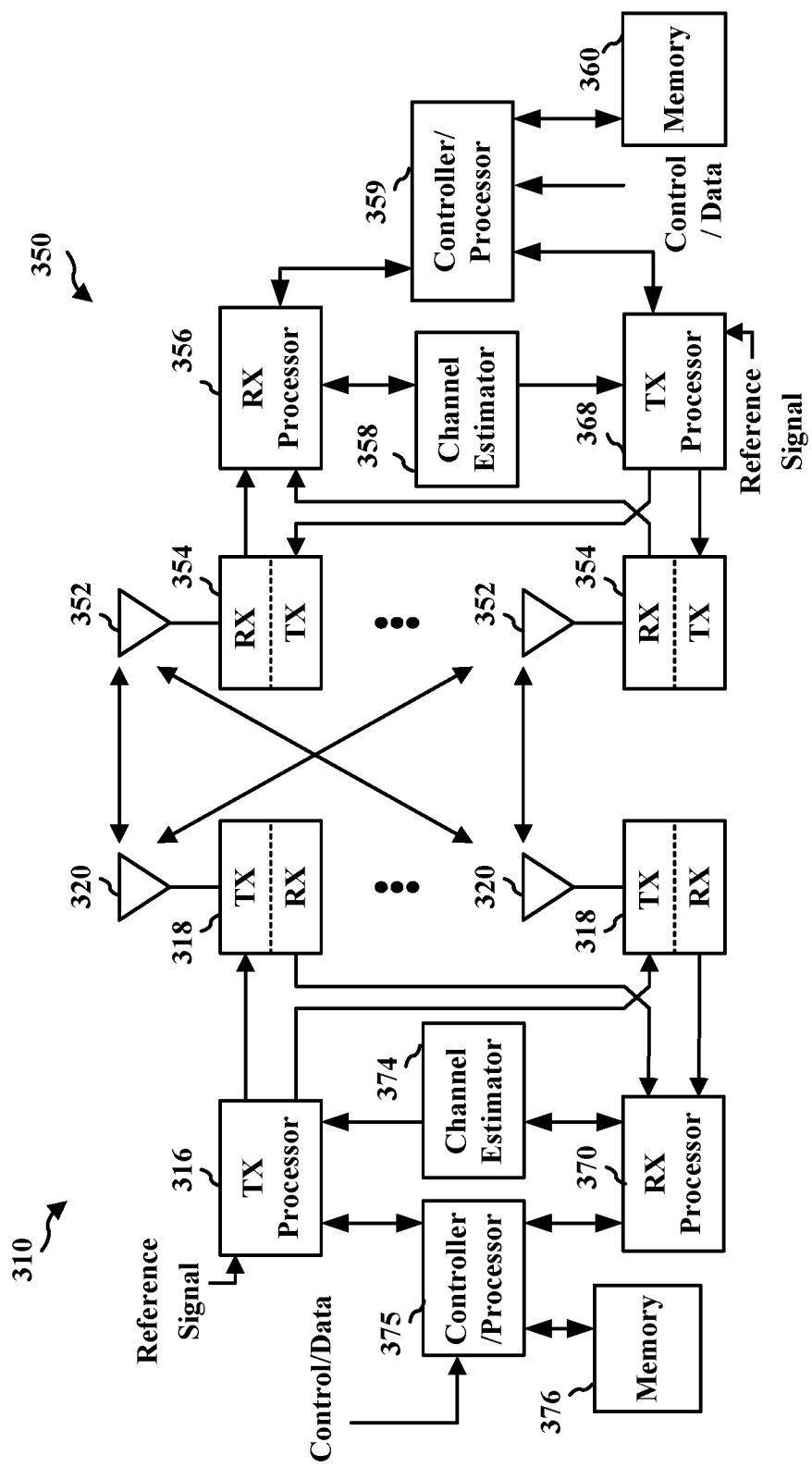
FIG. 3 is a diagram illustrating an example of a base station and UE in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. "Layer 3" includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. "Layer 1", which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354 TX. Each transmitter 354 TX may modulate an RF carrier with a respective spatial stream for transmission.

The UL transmission is processed at the base station 310 in a manner similar to that described in connection with the receiver function at the UE 350. Each receiver 318 RX receives a signal through its respective antenna 320. Each receiver 318 RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with SC PT-RS component 198 of FIG. 1. At least one of the TX processor 316, the RX processor 370, and the controller/processor 375 may be configured to perform aspects in connection with SC PT-RS component 199 of FIG. 1.

In some aspect of wireless communications, e.g., 5G NR, a PT-RS may be used to track and correct phase errors of one or more received symbols (e.g., in mmW systems). Phase errors may be caused by one or more of phase noise, carrier frequency offset, and/or Doppler effect. Phase noise may take the form of rapid random fluctuations in the phase of a waveform that may be caused by jitter of an oscillator in a wireless link. Phase noise may have a large impact on high frequency (e.g., mmW) systems. In some aspects, the large impact of phase noise on high frequency systems may be due to hardware that is less accurate and/or stable compared to lower-frequency systems. In some aspects of wireless communication, for a CP-OFDM waveform, one or two ports may be associated with a PT-RS, while for a single-carrier DFT-s-OFDM waveform, one port may be associated with a PT-RS. As multi-layer and multi-port single-carrier (e.g., DFT-s-OFDM) waveforms may be used for high-frequency systems, there may be a benefit to associating multiple layers and/or multiple ports of a single carrier waveform with a PT-RS.

Figure 4:
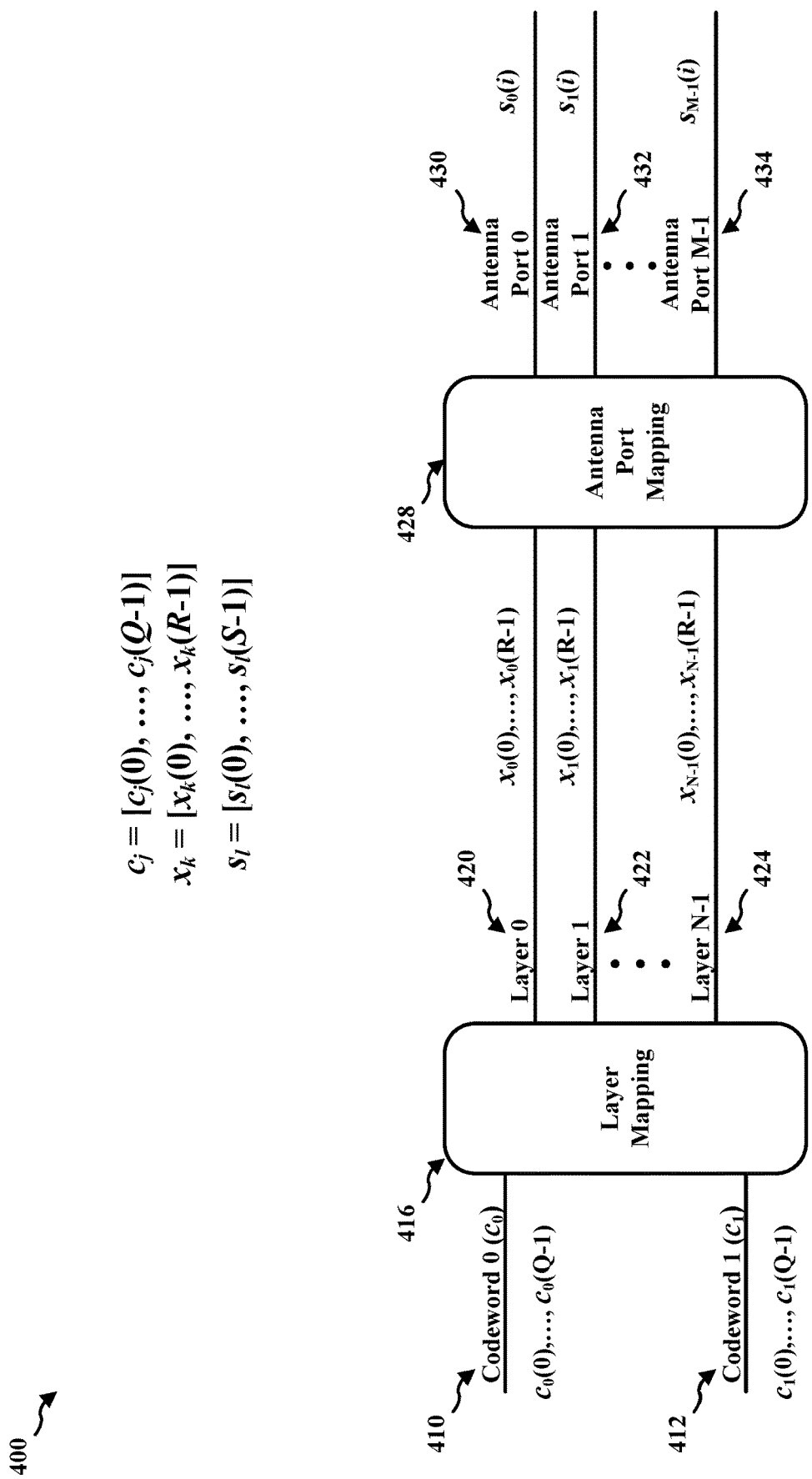
FIG. 4 is a diagram illustrating antenna mapping for a pair of codewords.

FIG. 4 is a diagram 400 illustrating antenna mapping for a pair of codewords 410 and 412. Diagram 400 illustrates a pair of codewords (e.g., codeword 0 ($c_0$) 410 and codeword 1 ($c_1$) 412) that are mapped by a layer mapping 416 onto a set of "N" layers (e.g., layer 0 420, layer 1 422, or layer N−1 424) and eventually mapped onto antenna ports $s_l$ (e.g., antenna port 0 ($s_0$) 430, antenna port 1 ($s_1$) 432, and antenna port M−1 ($s_{M-1}$) 434). A codeword (e.g., the codeword 0 410 and the codeword 1 412) may be a modulated signal including (1) data associated with a transport block and (2) a set of reference signals (e.g., DM-RS, PT-RS, etc.). A codeword $c_1$ (e.g., the codeword 0 410 and the codeword 1 412) may include a set of symbols $c_j(i)$, for j=0, ..., C−1, and i=0, ..., Q−1, where C is a number of codewords and Q is a number of symbols per codeword. In some aspects, one or more symbols of the codeword may include a set of samples associated with a PT-RS. The set of samples associated with the PT-RS may be allocated in "chunks" of two or four bits where the number of "chunks" may be allocated based on a phase noise associated with the PT-RS transmission. For example, a transmission associated with a large amount of phase noise (or high levels of phase noise) may be allocated more bits (e.g., more, or bigger, chunks) than a transmission associated with a small amount of phase noise (or low levels of phase noise).

The symbols, $c_j(i)$, of the codewords may be mapped onto a set of symbols $x_k(i)$, for k=0, ..., N−1, and i=0, ..., R−1, where N is a number of layers and R is a number of symbols per layer. In some aspects, each codeword $c_1$ may be mapped to a subset of layers $x_k$, for example, $c_0$ 410 may be mapped to a subset of layers $x_k$, for k=0, ...

$$\left\lfloor \frac{(N-1)}{C} \right\rfloor,$$

where $$\left\lfloor \frac{(N-1)}{C} \right\rfloor$$

is a floor function, and $c_1$ 412 may be mapped to a subset of layers $x_k$, for $$k = \left\lfloor \frac{(N-1)}{C} \right\rfloor + 1, \ldots, N-1.$$

In turn, the set of layers $x_k$ may be mapped to a set of antenna ports $s_l$ (e.g., via precoding 428, where l=0, ..., M−1). For example, the set of symbols $x_k(i)$ may be mapped to a set of symbols $s_l(i)$. In some aspects, the number of layers, N, may be (1) greater than or equal to the number of codewords, C, and (2) less than or equal to the number of antenna ports, M.

Figure 5:
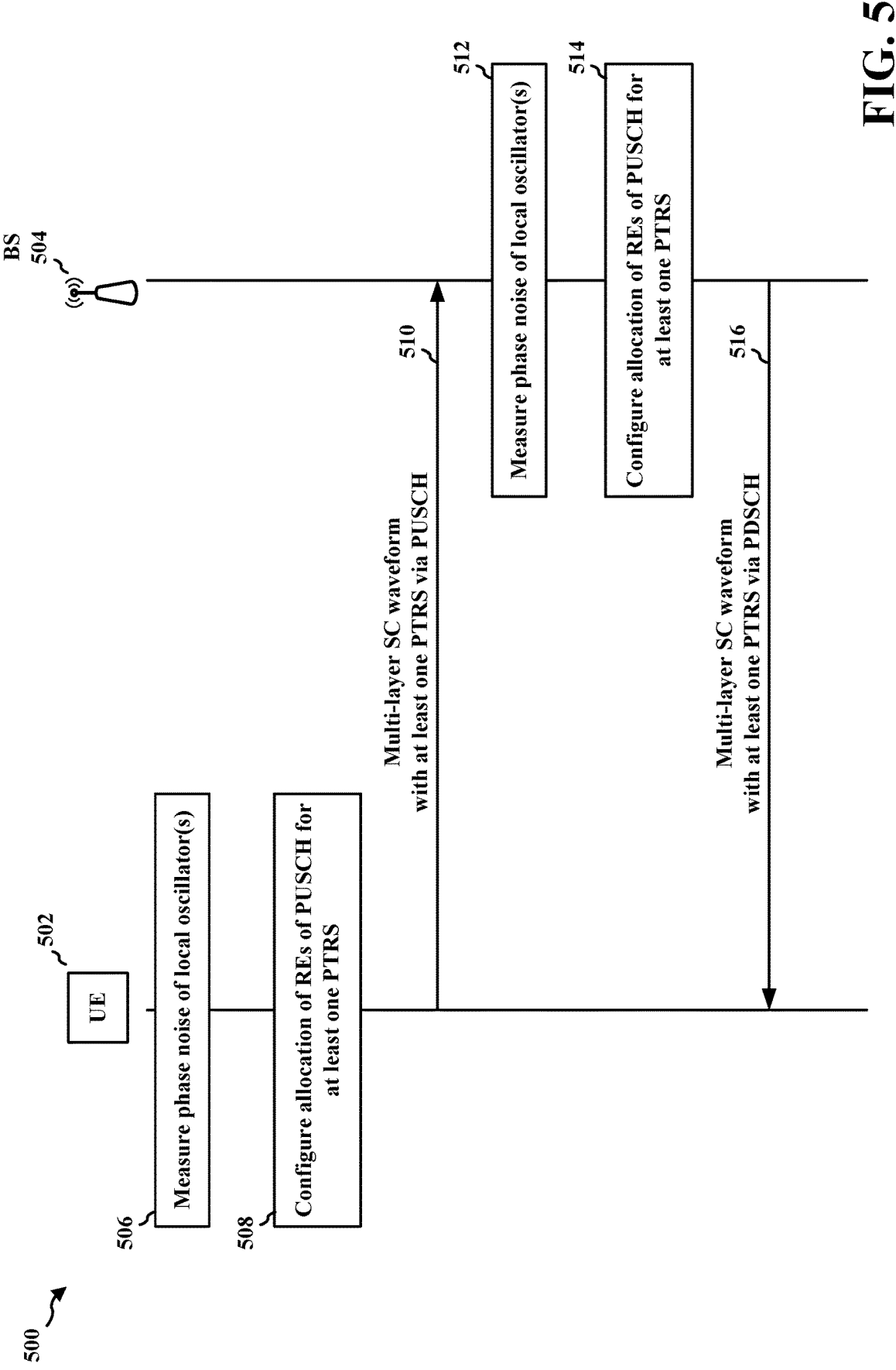
FIG. 5 is a call flow diagram illustrating a system for associating a PT-RS with a multi-layer and/or multi-port single carrier waveform.

FIG. 5 is a call flow diagram 500 illustrating a system for associating a PT-RS with a multi-layer and/or multi-port single carrier waveform. The UE 502 may measure 506 a phase noise of one or more local oscillators (e.g., a set of one or more local oscillators including a first local oscillator and/or a second local oscillator). The one or more oscillators may correspond to one or more antenna ports associated with one or more transmission configuration indicator (TCI) states or one or more UE panels and/or UE physical antennas. For example, the first local oscillator and/or the second local oscillator may each feed multiple corresponding UE panels (and/or physical antennas) or multiple different oscillators may feed different UE panels (and/or physical antennas) or may be associated with different TCI states. Additionally, in some aspects, a first local oscillator may be associated with a first port (e.g., antenna port 0 430 of FIG. 4) and a second local oscillator may be associated with a second port (e.g., antenna port 1 432 of FIG. 4).

Based on the measured phase noise associated with a first local oscillator, the UE 502 may configure 508 an allocation of a first set of one or more REs of a PUSCH for at least one PT-RS associated with a first port. The first set of one or more REs may include multiple layers associated with a multiple-layer single-carrier waveform transmission (e.g., a DFT-s-OFDM waveform). For example, the multiple layers may be mapped to the first set of REs of the PUSCH. Within the first set of REs, a number of samples (e.g., bits) may be allocated for the PT-RS within each RE in the first set of REs. For example, the samples may be allocated in a number of chunks of samples per symbol/RE (e.g., one, two, four, or eight chunks of two or four samples/bits). In some aspects, the measured phase noise may correspond to at least one of a PUCCH or UCI.

In some aspects, the multiple layers included in the PUSCH transmission may be associated with the first local oscillator and the at least one PT-RS is associated with a first layer of the multiple layers. The first layer associated with the at least one PT-RS, in some aspects, may be a strongest layer of the multiple layers included in the PUSCH transmission. The strength of the multiple layers may be measured based on a reference signal receive power (RSRP), a reference signal received quality (RSRQ), a signal-to-noise ratio (SNR), or some other relevant measure of signal strength. As will be described in relation to FIGS. 6-10, the at least one PT-RS in a first layer may overlap in time with one of data, a PT-RS, or a gap (e.g., empty samples) in one or more other layers. The PT-RS in another layer, in some aspects, may be the at least one PT-RS transmitted over multiple layers. In some aspects, the PT-RS in another layer may be an independent PT-RS from the at least one PT-RS and may be associated with a second oscillator.

The multiple layers included in the PUSCH transmission, in some aspects, may be associated with multiple codewords (e.g., codeword 0 410 and codeword 1 412 of FIG. 4) and the at least one PT-RS may be associated with a first codeword of the multiple codewords. In some aspects, the first codeword may be a strongest codeword of the multiple codewords. The strongest codeword may be associated with a highest RSRP, RSRQ, SNR, or some other relevant measure of signal strength. As will be described in relation to FIGS. 6-10, the at least one PT-RS associated with a first codeword may overlap in time with one of data, a PT-RS, or a gap (e.g., empty samples) associated with one or more other codewords (e.g., transmitted via one or more layers onto which the other codewords are mapped). The PT-RS associated with another codeword (e.g., associated with another layer onto which the other codeword was mapped), in some aspects, may be a copy of the at least one PT-RS (e.g., the PT-RS associated with the first oscillator). In some aspects, the PT-RS associated with another codeword may be an independent PT-RS from the at least one PT-RS and may be associated with a second oscillator.

Based on a measured 506 phase noise associated with a second local oscillator, the UE 502 may configure 508 an allocation of a second set of one or more REs of the PUSCH for at least one additional PT-RS associated with a second port. The second set of one or more REs may include multiple layers associated with the multiple-layer single-carrier waveform transmission (e.g., a DFT-s-OFDM waveform). For example, the multiple layers may be mapped to the second set of REs of the PUSCH. Within the second set of REs, a number of samples (e.g., bits) may be allocated for the PT-RS within each RE in the second set of REs. For example, the samples for the second set of REs may be allocated in a number of chunks of samples per symbol/RE (e.g., one, two, four or eight chunks of two or four samples/ bits) that may be the same as, or different from, the number of chunks (or the size of the chunks) of samples per symbol/RE allocated for the first set of REs. In some aspects, the measured phase noise may correspond to at least one of a PUCCH or UCI.

In some aspects, the second set of REs may be associated with the at least one additional PT-RS and the at least one additional PT-RS may be associated with a second layer of the multiple-layer single-carrier waveform transmission. The second set of REs (1) may be identical to the first set of REs, (2) may partially overlap with the first set of REs, or (3) may be disjoint from the first set of REs. The second layer associated with the at least one additional PT-RS, in some aspects, may be a strongest layer of multiple layers associated with the second oscillator included in the PUSCH transmission. The strength of the multiple layers may be measured based on a RSRP, a RSRQ, a SNR, or some other relevant measure of signal strength.

As will be described in relation to FIGS. 6-10, the at least one PT-RS in the second layer may overlap in time with one of data, a PT-RS, or a gap (e.g., empty samples) in one or more other layers. The PT-RS in another layer, in some aspects, may be the at least one additional PT-RS transmitted over multiple layers. In some aspects, the PT-RS in another layer may be an independent PT-RS from the at least one additional PT-RS and may be associated with a different oscillator. The at least one additional PT-RS may also be associated with a different antenna port of the UE 502 than the at least one PT-RS. The at least one PT-RS and the at least one additional PT-RS may be time-domain multiplexed such that the at least one PT-RS and the at least one additional PT-RS are non-overlapping in time. In some aspects, the at least one PT-RS and the at least one additional PT-RS may be overlapping in time. The at least one PT-RS and the at least one additional PT-RS, in some aspects, may be spatially multiplexed and/or code-division multiplexed.

The UE 502 may also measure 506 a phase noise of additional local oscillators. The additional local oscillators may be associated with additional PT-RS. The additional PT-RS may be transmitted in additional sets of REs of the PUSCH. Other aspects of the additional PT-RS associated with an additional local oscillator are similar to those described above relating to a second oscillator applied to each a measured phase noise and PT-RS associated with the additional local oscillator. The UE 502 may then transmit, and base station 504 may receive, a multi-layer single carrier waveform 510 including at least one PT-RS (e.g., a set of PT-RS associated with one or more local oscillators) via a PUSCH.

The base station 504 may measure 512 a phase noise of one or more local oscillators (e.g., a set of one or more local oscillators including a first local oscillator and/or a second local oscillator). The one or more oscillators may correspond to one or more antenna ports associated with one or more TCI states or one or more UE panels and/or UE physical antennas. For example, the first local oscillator and/or the second local oscillator may each feed multiple corresponding UE panels (and/or physical antennas) or multiple different oscillators may feed different UE panels (and/or physical antennas) or may be associated with different TCI states. Additionally, in some aspects, a first local oscillator may be associated with a first port (e.g., antenna port 0 430 of FIG. 4) and a second local oscillator may be associated with a second port (e.g., antenna port 1 432 of FIG. 4).

Based on the measured phase noise associated with a first local oscillator, the base station 504 may configure 514 an allocation of a first set of one or more REs of a PDSCH for at least one PT-RS associated with a first port. The first set of one or more REs may include multiple layers associated with a multiple-layer single-carrier waveform transmission (e.g., a DFT-s-OFDM waveform). For example, the multiple layers may be mapped to the first set of REs of the PDSCH. Within the first set of REs, a number of samples (e.g., bits) may be allocated for the PT-RS within each RE in the first set of REs. For example, the samples may be allocated in a number of chunks of samples per symbol/RE (e.g., two, four or eight chunks of two or four samples/bits). In some aspects, the measured phase noise may correspond to at least one of a PDCCH or DCI.

In some aspects, the multiple layers included in the PDSCH transmission may be associated with the first local oscillator and the at least one PT-RS is associated with a first layer of the multiple layers. The first layer associated with the at least one PT-RS, in some aspects, may be a strongest layer of the multiple layers included in the PDSCH transmission. The strength of the multiple layers may be measured based on a RSRP, a RSRQ, a SNR, or some other relevant measure of signal strength. As will be described in relation to FIGS. 6-10, the at least one PT-RS in a first layer may overlap in time with one of data, a PT-RS, or a gap (e.g., empty samples) in one or more other layers. The PT-RS in another layer, in some aspects, may be the at least one PT-RS transmitted over multiple layers. In some aspects, the PT-RS in another layer may be an independent PT-RS from the at least one PT-RS and may be associated with a second oscillator.

The multiple layers included in the PDSCH transmission, in some aspects, may be associated with multiple codewords (e.g., codeword 0 410 and codeword 1 412 of FIG. 4) and the at least one PT-RS may be associated with a first codeword of the multiple codewords. In some aspects, the first codeword may be a strongest codeword of the multiple codewords. The strongest codeword may be associated with a highest RSRP, RSRQ, SNR, or some other relevant measure of signal strength. As will be described in relation to FIGS. 6-10, the at least one PT-RS associated with a first codeword may overlap in time with one of data, a PT-RS, or a gap (e.g., empty samples) associated with one or more other codewords (e.g., transmitted via one or more layers onto which the other codewords are mapped). The PT-RS associated with another codeword (e.g., associated with another layer onto which the other codeword was mapped), in some aspects, may be a copy of the at least one PT-RS (e.g., the PT-RS associated with the first oscillator). In some aspects, the PT-RS associated with another codeword may be an independent PT-RS from the at least one PT-RS and may be associated with a second oscillator.

Based on a measured 512 phase noise associated with a second local oscillator, the base station 504 may configure 514 an allocation of a second set of one or more REs of the PDSCH for at least one additional PT-RS associated with a second port. The second set of one or more REs may include multiple layers associated with the multiple-layer single-carrier waveform transmission (e.g., a DFT-s-OFDM waveform). For example, the multiple layers may be mapped to the second set of REs of the PDSCH. Within the second set of REs, a number of samples (e.g., bits) may be allocated for the PT-RS within each RE in the second set of REs. For example, the samples for the second set of REs may be allocated in a number of chunks of samples per symbol/RE (e.g., two, four or eight chunks of two or four samples/bits) that may be the same as, or different from, the number of chunks (or the size of the chunks) of samples per symbol/RE allocated for the first set of REs. In some aspects, the measured phase noise may correspond to at least one of a PDCCH or DCI.

In some aspects, the second set of REs may be associated with the at least one additional PT-RS and the at least one additional PT-RS may be associated with a second layer of the multiple-layer single-carrier waveform transmission. The second set of REs (1) may be identical to the first set of REs, (2) may partially overlap with the first set of REs, or (3) may be disjoint from the first set of REs. The second layer associated with the at least one additional PT-RS, in some aspects, may be a strongest layer of multiple layers associated with the second oscillator included in the PDSCH transmission. The strength of the multiple layers may be measured based on a RSRP, a RSRQ, a SNR, or some other relevant measure of signal strength.

As will be described in relation to FIGS. 6-10, the at least one PT-RS in the second layer may overlap in time with one of data, a PT-RS, or a gap (e.g., empty samples) in one or more other layers. The PT-RS in another layer, in some aspects, may be the at least one additional PT-RS transmitted over multiple layers. In some aspects, the PT-RS in another layer may be an independent PT-RS from the at least one additional PT-RS and may be associated with a different oscillator. The at least one additional PT-RS may also be associated with a different antenna port of the base station 504 than the at least one PT-RS. The at least one PT-RS and the at least one additional PT-RS may be time-domain multiplexed such that the at least one PT-RS and the at least one additional PT-RS are non-overlapping in time. In some aspects, the at least one PT-RS and the at least one additional PT-RS may be overlapping in time. The at least one PT-RS and the at least one additional PT-RS, in some aspects, may be spatially multiplexed and/or code-division multiplexed.

The base station 504 may also measure 512 a phase noise of additional local oscillators. The additional local oscillators may be associated with additional PT-RS. The additional PT-RS may be transmitted in additional sets of REs of the PDSCH. Other aspects of the additional PT-RS associated with an additional local oscillator are similar to those described above relating to a second oscillator applied to each a measured phase noise and PT-RS associated with the additional local oscillator. The base station 504 may then transmit, and UE 502 may receive, a multi-layer single carrier waveform 516 including at least one PT-RS (e.g., a set of PT-RS associated with one or more local oscillators) via a PDSCH.

Figure 6:
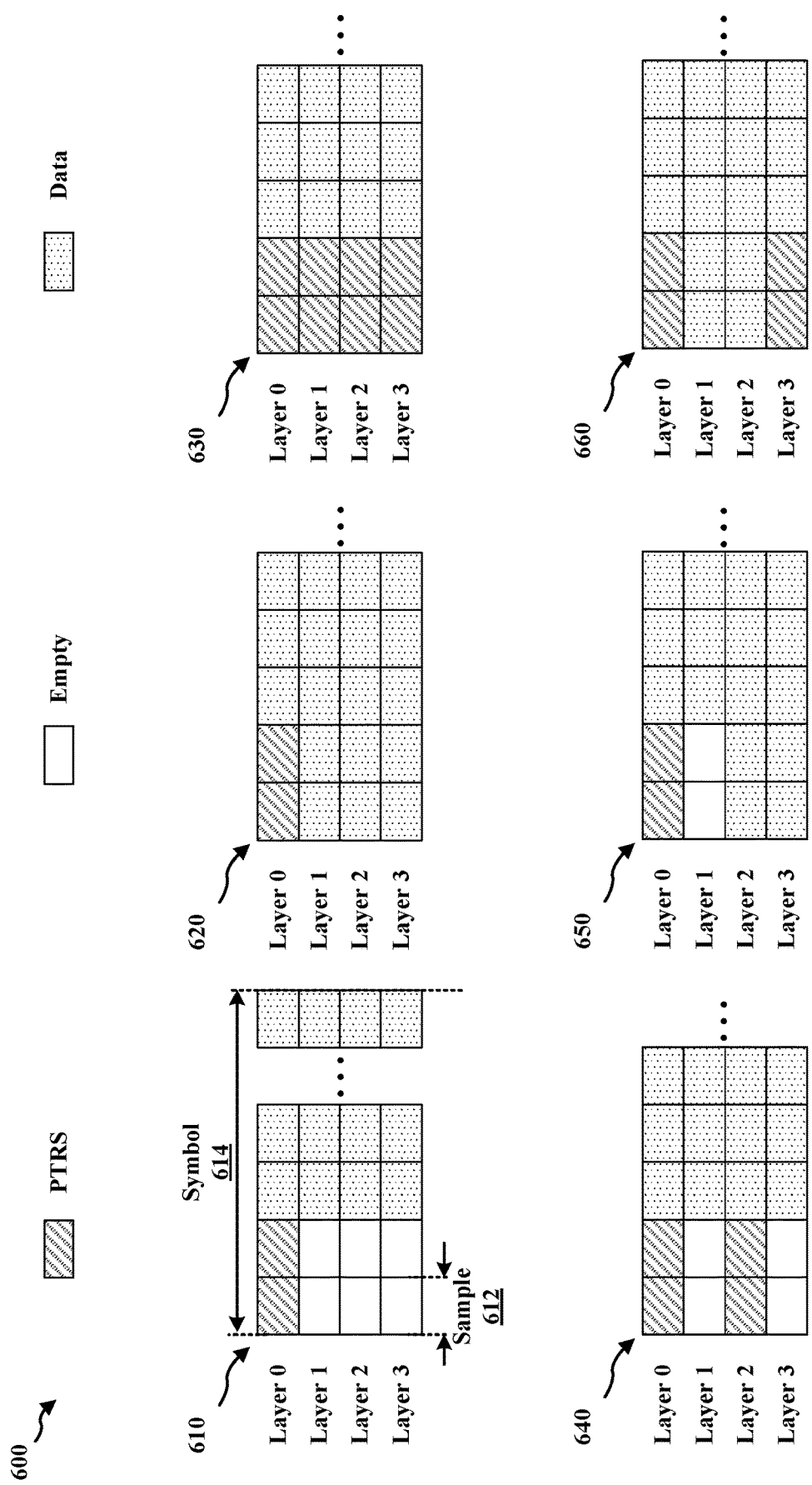
FIG. 6 is a diagram illustrating a set of options for transmitting a PT-RS in one or more layers of a four-layer single carrier waveform.

FIG. 6 is a diagram 600 illustrating a set of options for transmitting a PT-RS in one or more layers of a four-layer single carrier waveform. Diagram 600 includes diagram 610 illustrating a set of samples (e.g., sample 612) of a symbol 614. Diagram 610 illustrates two samples of a PT-RS encoded in a first layer (e.g., "Layer 0"), where other layers (e.g., "Layer 1" through "Layer 3") do not include data or PT-RS samples. The first layer (e.g., "Layer 0") may be a strongest layer as measured by a RSRP, a RSRQ, a SNR, etc., compared to the additional layers (e.g., "Layer 1" through "Layer 3"). In the first layer (or the additional layers), the PT-RS (or empty) samples may be followed in the symbol by data samples of the first layer (or the additional layers). Diagram 620 illustrates two samples of a PT-RS encoded in the first layer (e.g., "Layer 0"), where other layers (e.g., "Layer 1" through "Layer 3") include data of the other layers. The first layer (e.g., "Layer 0") may be a strongest layer as measured by a RSRP, a RSRQ, a SNR, etc., compared to the additional layers (e.g., "Layer 1" through "Layer 3"). The overlapping samples of PT-RS and data may be pre-coded to provide orthogonality between the data and the PT-RS. In the first layer (and the additional layers), the PT-RS (and data) samples may be followed in the symbol by data samples of the first layer (or the additional layers).

Diagram 630 illustrates two samples of a PT-RS encoded in each of multiple layers (e.g., "Layer 0" through "Layer 3"). Each layer may be encoded with the same PT-RS samples. In each layer, the PT-RS samples may be followed in the symbol by data samples of the layer. Diagram 640 through diagram 660 illustrate different configurations of PT-RS, empty samples, and data. Diagram 640 illustrates a set of two PT-RS samples that are encoded in two layers (e.g., "Layer 0" and "Layer 2") with empty samples in the other two layers (e.g., "Layer 1" and "Layer 3"). Diagram 650 illustrates a PT-RS in a first layer (e.g., "Layer 1"), an empty second layer (e.g., "Layer 2") and data in two additional layers (e.g., "Layer 2" and "Layer 3"). Diagram 660 illustrates a set of two PT-RS samples that are encoded in two layers (e.g., "Layer 0" and "Layer 3") with data samples in the other two layers (e.g., "Layer 1" and "Layer 2"). In some aspects, a symbol may include different numbers of layers or different allocations of one or more layers of PT-RS samples, empty samples, and data samples.

Figure 7:
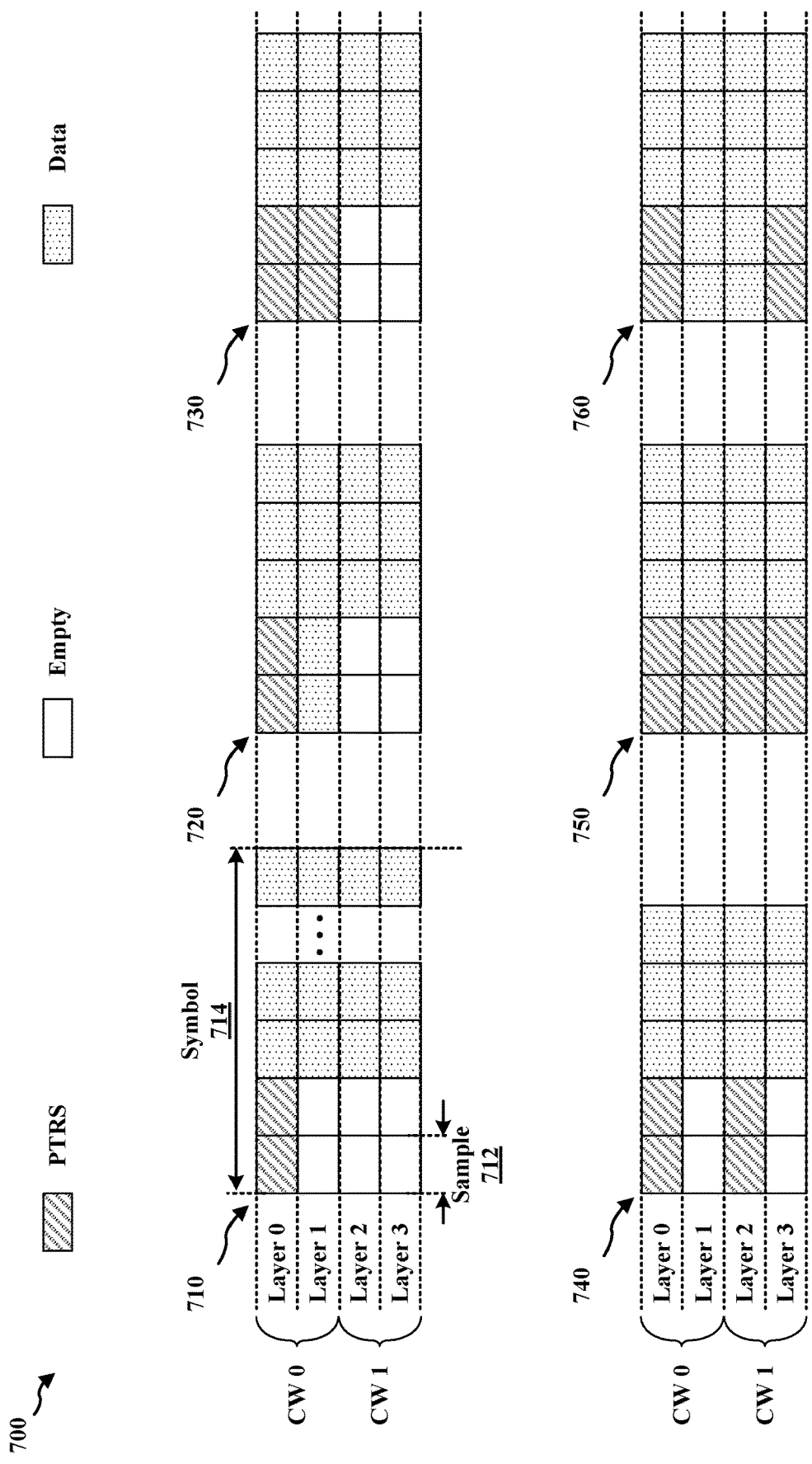
FIG. 7 is a diagram illustrating a set of options for associating a PT-RS with one or more codewords and transmitting a PT-RS in one or more layers of a four-layer single carrier waveform.

FIG. 7 is a diagram 700 illustrating a set of options for associating a PT-RS with one or more codewords and transmitting a PT-RS in one or more layers of a four-layer single carrier waveform. Diagram 700 includes diagram 710 illustrating a set of samples (e.g., sample 712) of a symbol 714. Diagram 710 illustrates two samples of a PT-RS encoded in a first layer (e.g., "Layer 0") associated with a first codeword (e.g., CW 0), where another layer associated with the first codeword (e.g., "Layer 1") does not include data or PT-RS samples. The layers associated with a second codeword (e.g., CW 1) may be associated with the same PT-RS and may not include samples overlapping with the PT-RS associated with the first codeword. The first layer (e.g., "Layer 0") may be a strongest layer as measured by a RSRP, a RSRQ, a SNR, etc., compared to the additional layer(s) associated with the first codeword (e.g., "Layer 1"). In the first layer (or the additional layers), the PT-RS (or empty) samples may be followed in the symbol by data samples of the first layer (or the additional layers).

Diagram 720 illustrates two samples of a PT-RS encoded in the first layer (e.g., "Layer 0"), where other layer(s) associated with the first codeword (e.g., "Layer 1") include data of the other layer(s). The first layer (e.g., "Layer 0") may be a strongest layer associated with the first codeword as measured by a RSRP, a RSRQ, a SNR, etc., compared to the additional layers (e.g., "Layer 1"). The overlapping samples of PT-RS and data may be pre-coded to provide orthogonality between the data and the PT-RS. In the first layer (and the additional layers), the PT-RS (and data) samples may be followed in the symbol by data samples of the first layer (or the additional layers).

Diagram 730 illustrates two samples of a PT-RS encoded in each of multiple layers (e.g., "Layer 0" and "Layer 1"). Each layer may be encoded with the same PT-RS samples. In each layer, the PT-RS samples may be followed in the symbol by data samples of the layer. Diagram 740 through diagram 760 illustrate different configurations of PT-RS, empty samples, and data for a single port PT-RS associated with two codewords (e.g., CW 0 and CW 1). Diagram 740 illustrates a set of two PT-RS samples that are encoded in one layer (e.g., "Layer 0" and "Layer 2") associated with each of two codewords with empty samples in the other two layers (e.g., "Layer 1" and "Layer 3"). For example, each codeword is configured as in diagram 710. Diagram 750 illustrates a PT-RS in each layer associated with each codeword (e.g., "Layer 0", "Layer 1", "Layer 2", and "Layer 3"). For example, the layers associated with each codeword are configured as described in relation to diagram 730.

Diagram 760 illustrates a set of two PT-RS samples that are encoded in two layers (e.g., "Layer 0" and "Layer 3") associated with different codewords and data samples associated with the different codewords in the other two layers (e.g., "Layer 1" and "Layer 2"). In some aspects, the codewords may be configured independently such that layers associated with a first codeword may be configured as illustrated in any of diagram 610 through diagram 660 and layers associated with a second codeword may be configured independently as illustrated in any of diagram 610 through diagram 660.

Figure 8:
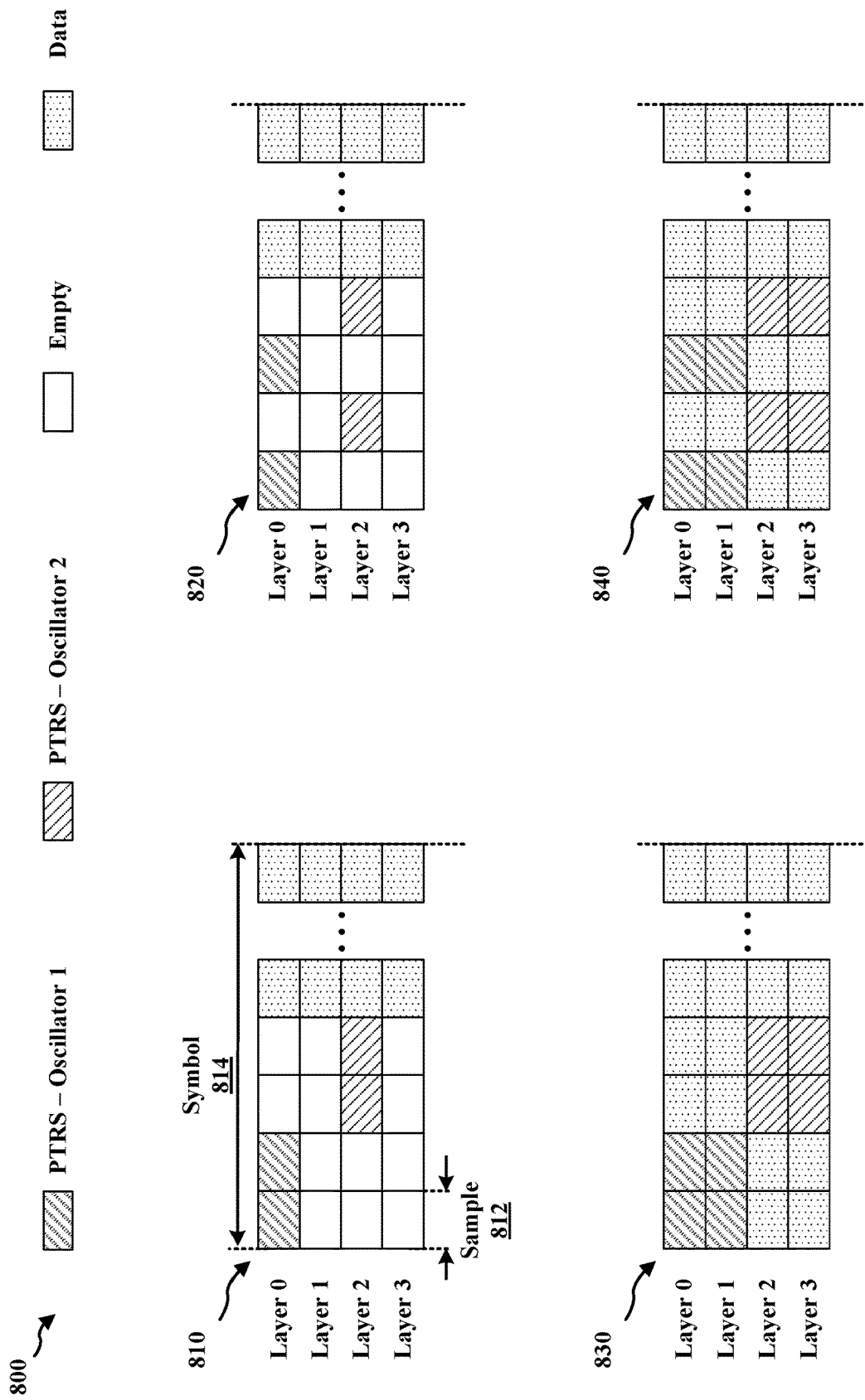
FIG. 8 is a diagram 800 illustrating a set of options for transmitting first and second PT-RS associated with a first and second oscillator in one or more layers of a four-layer single carrier waveform.

FIG. 8 is a diagram 800 illustrating a set of options for transmitting first and second PT-RS associated with a first and second oscillator in one or more layers of a four-layer single carrier waveform. Diagram 810 illustrates a set of samples (e.g., sample 812) of a symbol 814. Diagram 810 illustrates two samples of a first PT-RS associated with a first local oscillator encoded in a first layer (e.g., "Layer 0") being time-multiplexed with two non-overlapping samples of a second PT-RS associated with a second local oscillator in a third layer (e.g., "Layer 2"). Diagram 810 further illustrates that other layers (e.g., "Layer 1" and "Layer 3") do not include data or PT-RS samples. The first layer (e.g., "Layer 0") may be a strongest layer associated with the first local oscillator as measured by a RSRP, a RSRQ, a SNR, etc., compared to the additional layers (e.g., "Layer 1") associated with the first local oscillator. The third layer (e.g., "Layer 2") may be a strongest layer associated with the second local oscillator as measured by a RSRP, a RSRQ, a SNR, etc., compared to the additional layers (e.g., "Layer 3") associated with the second local oscillator. The samples associated with either the first or the second PT-RS may be followed in the symbol by data samples.

Diagram 820 illustrates two samples of a first PT-RS associated with a first local oscillator encoded in a first layer (e.g., "Layer 0") being time-multiplexed and interleaved with two non-overlapping samples of a second PT-RS associated with a second local oscillator in a third layer (e.g., "Layer 2"). Diagram 820 further illustrates that other layers (e.g., "Layer 1" and "Layer 3") do not include data or PT-RS samples. The first layer (e.g., "Layer 0") may be a strongest layer associated with the first local oscillator as measured by a RSRP, a RSRQ, a SNR, etc., compared to the additional layers (e.g., "Layer 1") associated with the first local oscillator. The third layer (e.g., "Layer 2") may be a strongest layer associated with the second local oscillator as measured by a RSRP, a RSRQ, a SNR, etc., compared to the additional layers (e.g., "Layer 3") associated with the second local oscillator. The samples associated with either the first or the second PT-RS may be followed in the symbol by data samples.

Diagram 830 illustrates two samples of a first PT-RS associated with a first local oscillator encoded in a first set of layers (e.g., "Layer 0" and "Layer 1") being time-multiplexed with two non-overlapping samples of a second PT-RS associated with a second local oscillator in a second set of layers (e.g., "Layer 2" and "Layer 3"). Diagram 830 further illustrates that, during the transmission of the first PT-RS associated with the first local oscillator in the first set of layers, data is transmitted via layers associated with the second local oscillator and vice versa. The samples not associated with either the first or the second PT-RS may include data samples.

Diagram 840 illustrates two samples of a first PT-RS associated with a first local oscillator encoded in a first set of layers (e.g., "Layer 0" and "Layer 1") being time-multiplexed and interleaved with two non-overlapping samples of a second PT-RS associated with a second local oscillator in a second set of layers (e.g., "Layer 2" and "Layer 3"). Diagram 840 further illustrates that, during the transmission of the first PT-RS associated with the first local oscillator in the first set of layers, data is transmitted via layers associated with the second local oscillator and vice versa. The samples not associated with either the first or the second PT-RS may include data samples.

Figure 9:
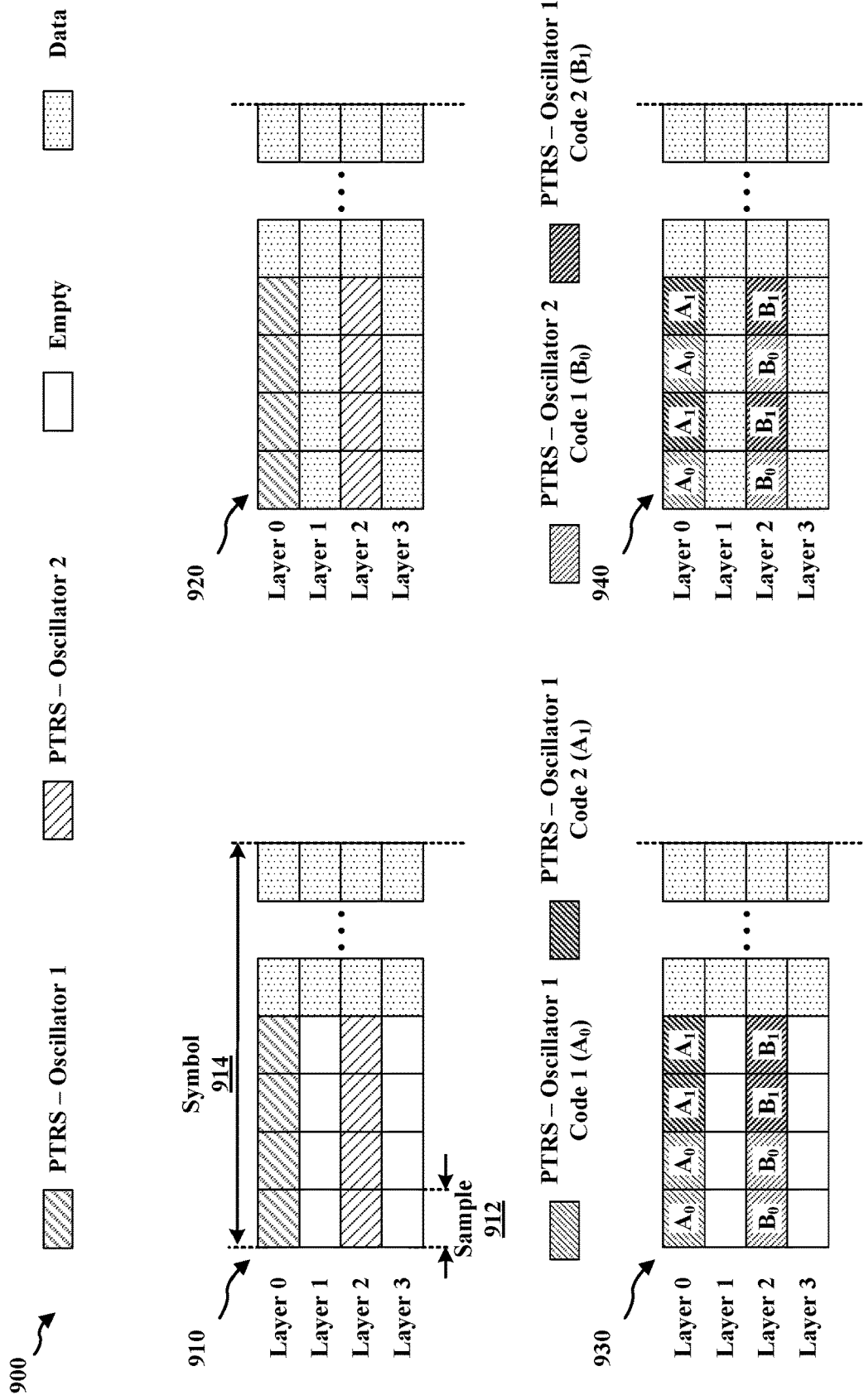
FIG. 9 is a diagram illustrating a set of options for transmitting first and second PT-RS associated with a first and second oscillator in one or more layers of a four-layer single carrier waveform.

FIG. 9 is a diagram 900 illustrating a set of options for transmitting first and second PT-RS associated with a first and second oscillator in one or more layers of a four-layer single carrier waveform. Diagram 910 illustrates a set of samples (e.g., sample 912) of a symbol 914. Diagram 910 illustrates four samples of a first PT-RS associated with a first local oscillator encoded in a first layer (e.g., "Layer 0") overlapping with four samples of a second PT-RS associated with a second local oscillator in a third layer (e.g., "Layer 2"). The samples of the first and second PT-RS may be spatially multiplexed to avoid interference. Diagram 910 further illustrates that other layers not including a PT-RS (e.g., "Layer 1" and "Layer 3") do not include data samples. The first layer (e.g., "Layer 0") may be a strongest layer associated with the first local oscillator as measured by a RSRP, a RSRQ, a SNR, etc., compared to the additional layers (e.g., "Layer 1") associated with the first local oscillator. The third layer (e.g., "Layer 2") may be a strongest layer associated with the second local oscillator as measured by a RSRP, a RSRQ, a SNR, etc., compared to the additional layers (e.g., "Layer 3") associated with the second local oscillator. The samples associated with either the first or the second PT-RS may be followed in the symbol by data samples.

Diagram 920 illustrates four samples of a first PT-RS associated with a first local oscillator encoded in a first layer (e.g., "Layer 0") overlapping with four samples of a second PT-RS associated with a second local oscillator in a third layer (e.g., "Layer 2"). The samples of the first and second PT-RS may be spatially multiplexed to avoid interference. Diagram 920 further illustrates that other layers not including a PT-RS (e.g., "Layer 1" and "Layer 3") include data samples. The first layer (e.g., "Layer 0") may be a strongest layer associated with the first local oscillator as measured by a RSRP, a RSRQ, a SNR, etc., compared to the additional layers (e.g., "Layer 1") associated with the first local oscillator. The third layer (e.g., "Layer 2") may be a strongest layer associated with the second local oscillator as measured by a RSRP, a RSRQ, a SNR, etc., compared to the additional layers (e.g., "Layer 3") associated with the second local oscillator. The samples associated with either the first or the second PT-RS may be followed in the symbol by data samples.

Diagram 930 illustrates four samples of a first PT-RS associated with a first local oscillator encoded in a first layer (e.g., "Layer 0") overlapping with four samples of a second PT-RS associated with a second local oscillator in a third layer (e.g., "Layer 2"). The samples of the first and second PT-RS may be associated with different spreading codes (e.g., for CDMA) to avoid interference. Diagram 930 further illustrates that other layers not including a PT-RS (e.g., "Layer 1" and "Layer 3") do not include data samples. The first layer (e.g., "Layer 0") may be a strongest layer associated with the first local oscillator as measured by a RSRP, a RSRQ, a SNR, etc., compared to the additional layers (e.g., "Layer 1") associated with the first local oscillator. The first PT-RS may further be associated with multiple spreading codes (e.g., a code $A_0$ and a code $A_1$) that may each be associated with two samples of the first PT-RS. The third layer (e.g., "Layer 2") may be a strongest layer associated with the second local oscillator as measured by a RSRP, a RSRQ, a SNR, etc., compared to the additional layers (e.g., "Layer 3") associated with the second local oscillator. The second PT-RS may further be associated with multiple spreading codes (e.g., a code $B_0$ and a code $B_1$) that may each be associated with two samples of the second PT-RS. The samples associated with either the first or the second PT-RS may be followed in the symbol by data samples.

Diagram 940 illustrates four samples of a first PT-RS associated with a first local oscillator encoded in a first layer (e.g., "Layer 0") overlapping with four samples of a second PT-RS associated with a second local oscillator in a third layer (e.g., "Layer 2"). The samples of the first and second PT-RS may be code division multiplexed (e.g., via CDMA) and/or spatially multiplexed to avoid interference. Diagram 940 further illustrates that other layers not including a PT-RS (e.g., "Layer 1" and "Layer 3") include data samples. The first layer (e.g., "Layer 0") may be a strongest layer associated with the first local oscillator as measured by a RSRP, a RSRQ, a SNR, etc., compared to the additional layers (e.g., "Layer 1") associated with the first local oscillator. The first PT-RS may further be associated with multiple spreading codes (e.g., a code $A_0$ and a code $A_1$) that may each be associated with two interleaved samples of the first PT-RS. The third layer (e.g., "Layer 2") may be a strongest layer associated with the second local oscillator as measured by a RSRP, a RSRQ, a SNR, etc., compared to the additional layers (e.g., "Layer 3") associated with the second local oscillator. The second PT-RS may further be associated with multiple spreading codes (e.g., a code $B_0$ and a code $B_1$) that may each be associated with two interleaved samples of the second PT-RS. The samples associated with either the first or the second PT-RS may be followed in the symbol by data samples.

Figure 10:
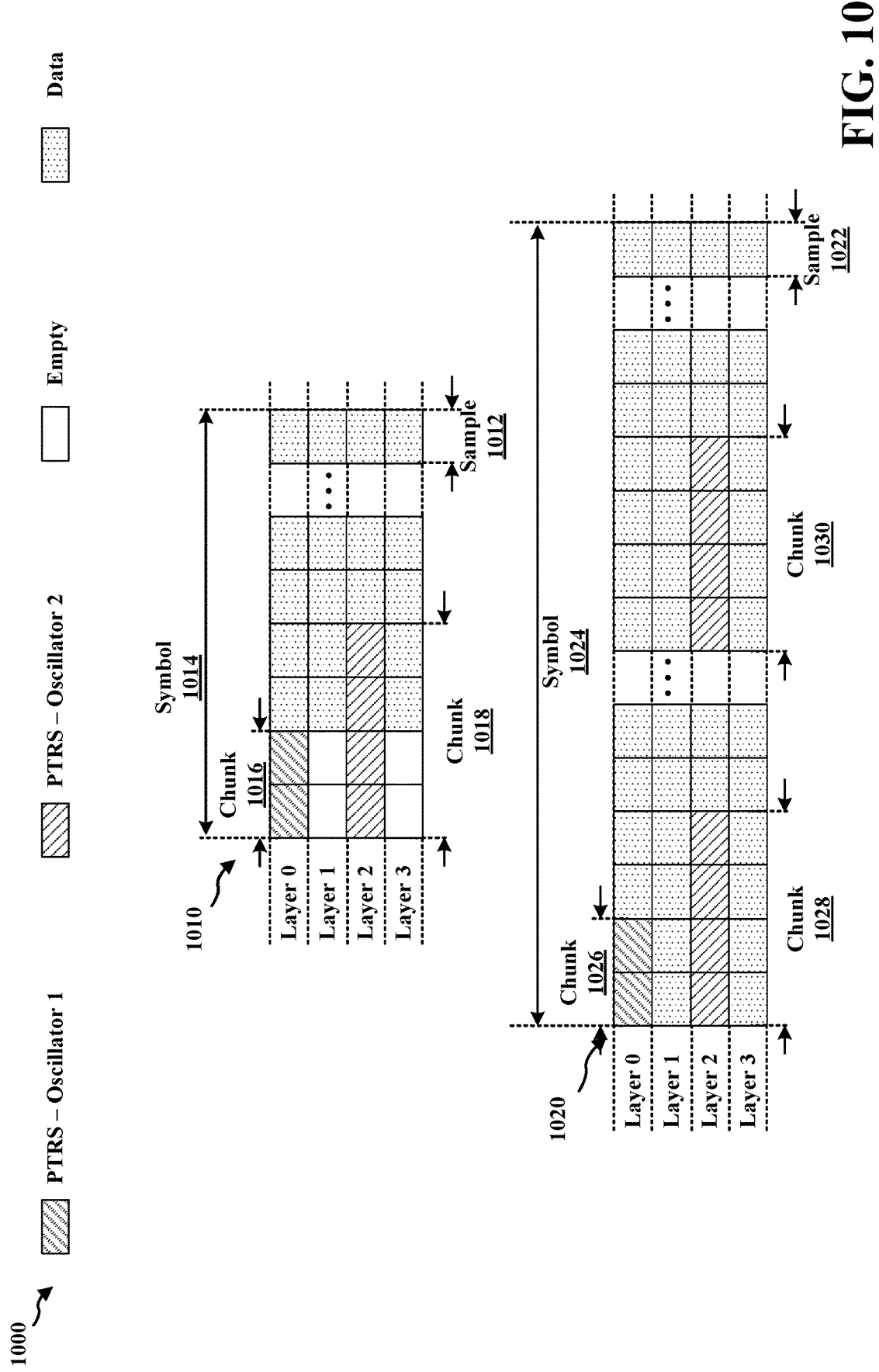
FIG. 10 is a diagram illustrating that a PT-RS associated with a first oscillator and a PT-RS associated with a second oscillator may be configured with different numbers of samples per symbol.

FIG. 10 is a diagram 1000 illustrating that a PT-RS associated with a first oscillator and a PT-RS associated with a second oscillator may be configured with different numbers of samples (e.g., sample 1012) per symbol (e.g., symbol 1014). Diagram 1010 illustrates that a number of samples (e.g., the two samples included in chunk 1016) configured for a PT-RS associated with a first local oscillator may be different from a number of samples (e.g., the four samples included in chunk 1018) configured for a PT-RS associated with a second local oscillator.

Diagram 1020 illustrates that in addition to a chunk size (e.g., a number of symbols 1022) being different for different PT-RS associated with different oscillators, the number of chunks per symbol may be different. Diagram 1020 illustrates a symbol 1024 that includes (1) a single chunk 1026 of two samples configured for a first PT-RS associated with a first local oscillator and (2) a first chunk 1028 and a second chunk 1030, each including four samples, configured for a PT-RS associated with a second local oscillator. For example, in some aspects, a first local oscillator associated with a first (low) measured phase noise may be associated with a PT-RS allocated a low number of samples per chunk (e.g., two samples instead of four samples) and/or a low number of chunks per symbol (e.g., 1 or 2 chunks per symbol instead of 4 or 8 chunks per symbol). In some aspects, a second local oscillator associated with a second (high) measured phase noise may be associated with a PT-RS allocated a high number of samples per chunk (e.g., four samples instead of two samples) and/or a high number of chunks per symbol (e.g., 4 or 8 chunks per symbol instead of 1 or 2 chunks per symbol).

Figure 11:
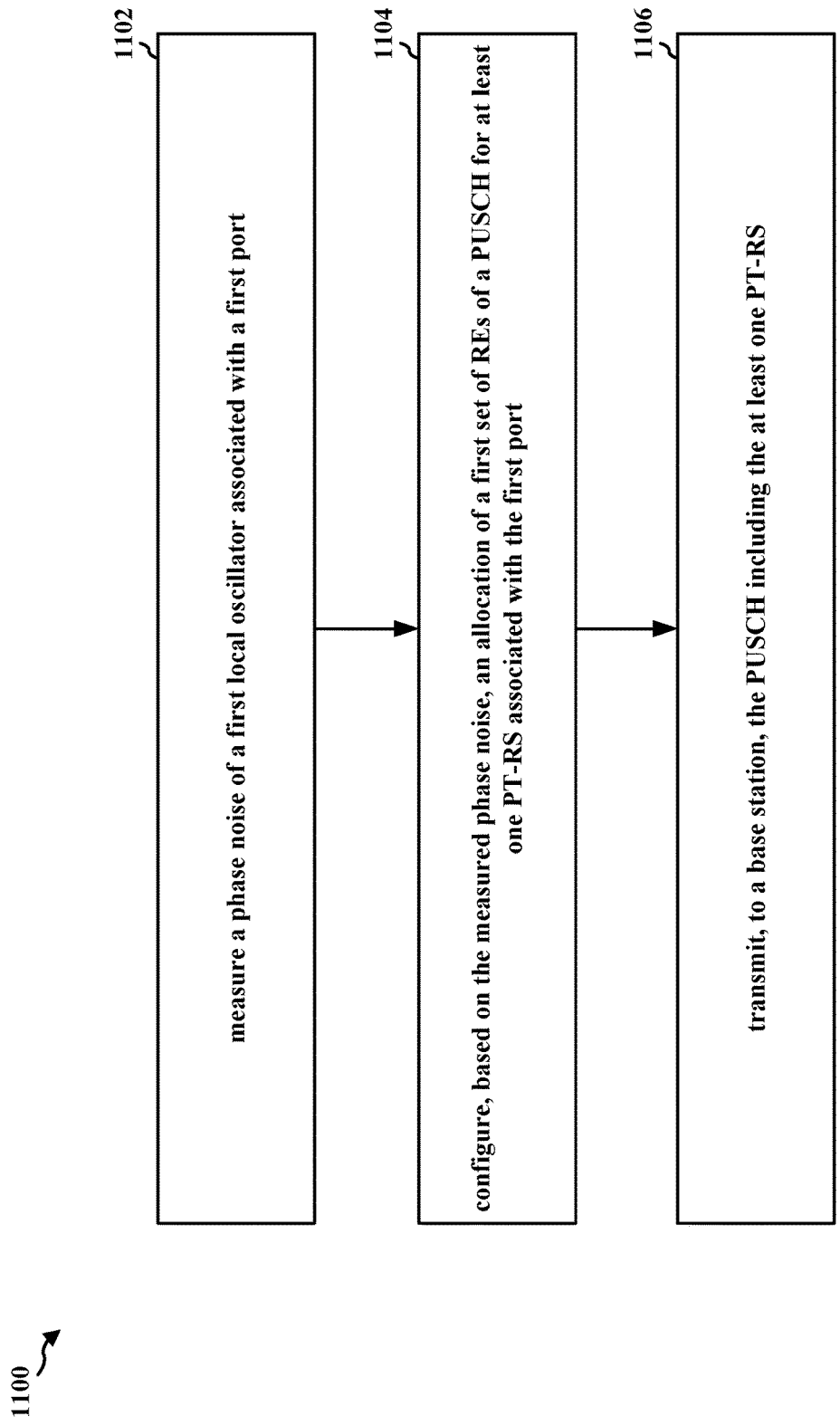
FIG. 11 is a flowchart of a method of wireless communication.

FIG. 11 is a flowchart 1100 of a method of wireless communication. The method may be performed by a UE (e.g., the UE 104, the UE 502; the apparatus 1302). In some aspects, the method may be performed by a base station (e.g., the base station 102/180, the base station 504; the apparatus 1402). At 1102, the UE and/or base station may measure a phase noise of a first local oscillator associated with a first port. The phase noise may be associated with one of a phase noise, a carrier frequency offset, and/or a Doppler effect. For example, referring to FIG. 5, a UE 502 may measure 506 a phase noise of a first local oscillator and/or a base station 504 may measure 512 a phase noise of a first local oscillator. For example, 1102 may be performed by a phase noise measurement component 1340 of FIG. 13, or by a phase noise measurement component 1440 of FIG. 14.

At 1104, the UE and/or the base station may configure, based on the measured (at 1102) phase noise, an allocation of a first set of REs of a PUSCH or a PDSCH for at least one PT-RS associated with the first port. The first set of REs may include multiple layers associated with a multiple-layer single-carrier waveform transmission. The phase noise measured by a UE may correspond to at least one of a PUCCH or UCI, while the phase noise measured by a base station may correspond to at least one of a PDCCH or DCI. The allocation of the first set of REs may include allocating samples of symbol(s) in the first set of REs. The allocated samples may be allocated as a number (e.g., one, two, four, or eight) of chunks of samples (e.g., two or four samples). For example, referring to FIG. 5, the UE 502 may configure 508 an allocation of a first set of one or more REs of a PUSCH for at least one PT-RS associated with a first port based on the measured phase noise. For example, referring to FIG. 5, a base station 504 may configure 508 an allocation of a first set of one or more REs of a PDSCH for at least one PT-RS associated with the first port. For example, 1104 may be performed by a PT-RS RE allocation component 1342 of FIG. 13, or by a PT-RS RE allocation component 1442 of FIG. 14.

In some aspects, the multiple layers included in the PUSCH and/or the PDSCH transmission may be associated with the first local oscillator and the at least one PT-RS is associated with a first layer of the multiple layers. The first layer associated with the at least one PT-RS, in some aspects, may be a strongest layer of the multiple layers included in the PUSCH and/or the PDSCH transmission. The strength of the multiple layers may be measured based on a RSRP, a RSRQ, a SNR, or some other relevant measure of signal strength. As was described in relation to FIGS. 6-10, the at least one PT-RS in a first layer may overlap in time with one of data, a PT-RS, or a gap (e.g., empty samples) in one or more other layers. For example, the at least one PT-RS associated with the first layer may overlap in time with data for at least a second layer of the multiple layers as described in relation to at least diagram 620 of FIG. 6. The PT-RS in another layer, in some aspects, may be the at least one PT-RS transmitted over multiple layers (e.g., the at least one PT-RS may be associated with one or more layers of the multiple layers). In some aspects, the PT-RS in another layer may be an independent PT-RS from the at least one PT-RS and may be associated with a second oscillator.

The multiple layers included in the PUSCH and/or the PDSCH transmission, in some aspects, are associated with multiple codewords (e.g., codeword 0 410 and codeword 1 412 of FIG. 4) and the at least one PT-RS may be associated with a first codeword of the multiple codewords. In some aspects, the first codeword may be a strongest codeword of the multiple codewords. The strongest codeword may be associated with a highest RSRP, RSRQ, SNR, or some other relevant measure of signal strength. As was described in relation to FIG. 7, the at least one PT-RS associated with a first codeword may overlap in time with one of data, a PT-RS, or a gap (e.g., empty samples) associated with one or more other codewords (e.g., transmitted via one or more layers onto which the other codewords are mapped). For example, the at least one PT-RS associated with the first codeword may overlap in time with data for at least a second codeword of the multiple codewords. The PT-RS associated with another codeword (e.g., associated with another layer onto which the other codeword was mapped), in some aspects, may be a copy of the at least one PT-RS (e.g., the at least one PT-RS is associated with one or more codewords of the multiple codewords). In some aspects, the PT-RS associated with another codeword may be an independent PT-RS from the at least one PT-RS and may be associated with a second oscillator.

At 1106, the UE (or base station) may transmit, to a base station (or a UE), the PUSCH (or PDSCH) including the at least one PT-RS. The at least one PT-RS may be transmitted via the configured allocation of the first set of REs. For example, referring to FIG. 5, the UE 502 may transmit, and a base station 504 may receive a multi-layer single carrier waveform 510 including the at least one PT-RS via a PUSCH or the base station 504 may transmit, and UE 502 may receive, a multi-layer single carrier waveform 516 including at least one PT-RS via a PDSCH. For example, 1106 may be performed by PT-RS transmission component 1344 of FIG. 13, or by a PT-RS transmission component 1444 of FIG. 14.

Figure 12:
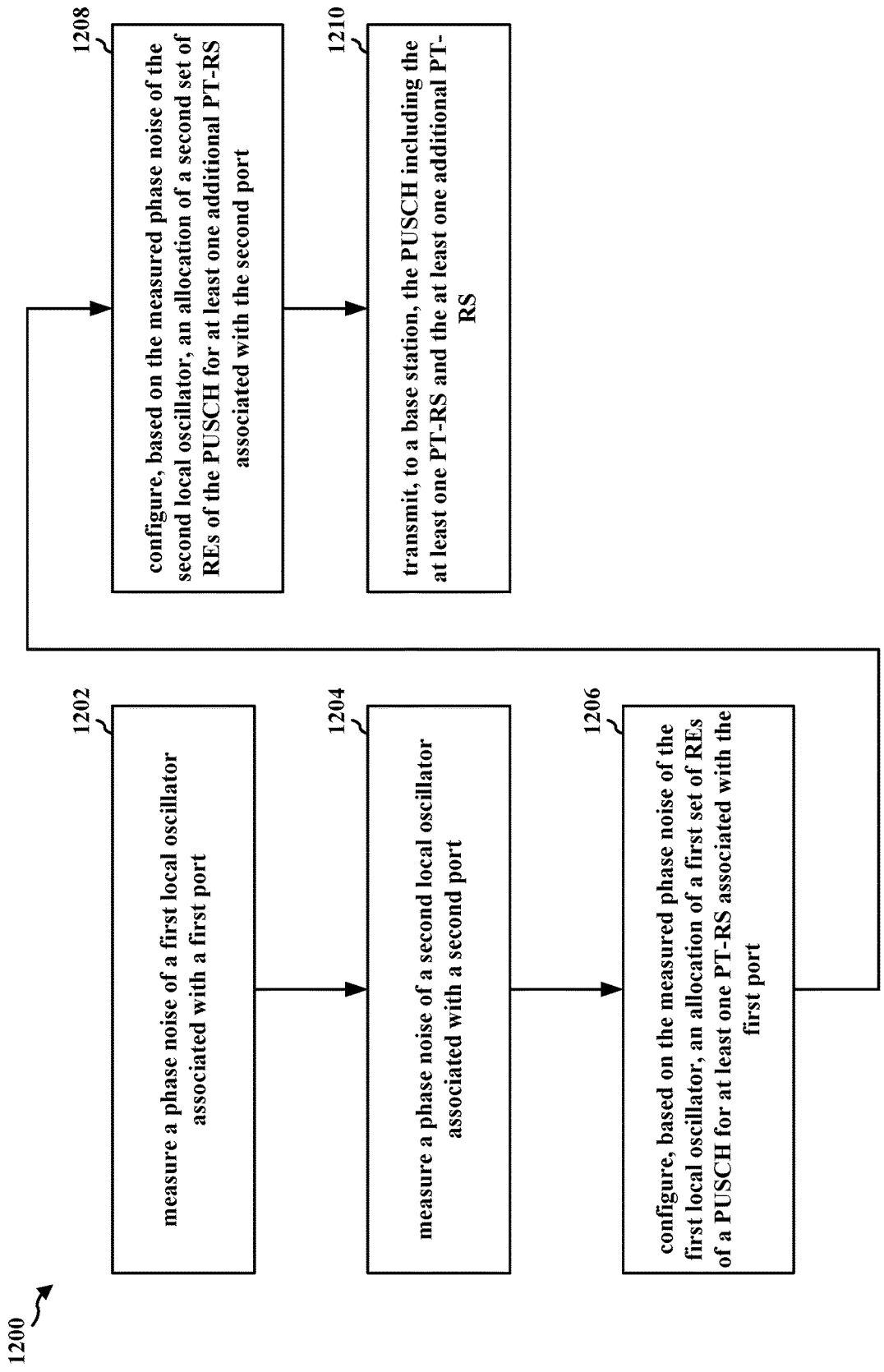
FIG. 12 is a flowchart of a method of wireless communication.

FIG. 12 is a flowchart 1200 of a method of wireless communication. The method may be performed by a UE (e.g., the UE 104, the UE 502; the apparatus 1302). In some aspects, the method may be performed by a base station (e.g., the base station 102/180, the base station 504; the apparatus 1402). At 1202, the UE and/or base station may measure a phase noise of a first local oscillator. The phase noise may be associated with one of a phase noise, a carrier frequency offset, and/or a Doppler effect. The first local oscillator may correspond to one or more antenna ports associated with a first TCI state or one or more UE panels and/or UE physical antennas. For example, the first local oscillator may feed multiple corresponding UE panels (and/or physical antennas) or multiple different oscillators may feed different UE panels (and/or physical antennas) or may be associated with different TCI states. At 1204, the UE and/or base station may measure a phase noise of a second local oscillator. The second local oscillator may correspond to one or more antenna ports associated with a second TCI state or one or more UE panels and/or UE physical antennas. Additionally, in some aspects, the first local oscillator may be associated with a first port (e.g., antenna port 0 430 of FIG. 4) and the second local oscillator may be associated with a second port (e.g., antenna port 1 432 of FIG. 4). For example, referring to FIG. 5, a UE 502 may measure 506 a phase noise of a first local oscillator and a phase noise of a second local oscillator and/or a base station 504 may measure 512 a phase noise of a first local oscillator and a phase noise of a second local oscillator. For example, 1202 and/or 1204 may be performed by a phase noise measurement component 1340 of FIG. 13, or by a phase noise measurement component 1440 of FIG. 14.

At 1206, the UE and/or the base station may configure, based on the measured (at 1202) phase noise of the first local oscillator, an allocation of a first set of REs of a PUSCH or a PDSCH for at least one PT-RS associated with the first port and (2) an allocation of a second set of REs of a PUSCH or a PDSCH for at least one additional PT-RS associated with the second port. At 1208, the UE and/or the base station may configure, based on the measured (at 1202) phase noise of the second local oscillator, an allocation of a second set of REs of a PUSCH or a PDSCH for at least one additional PT-RS associated with the second port. The first set of REs and/or the second set of REs may include multiple layers associated with a multiple-layer single-carrier waveform transmission. The phase noise measured by a UE may correspond to at least one of a PUCCH or UCI, while the phase noise measured by a base station may correspond to at least one of a PDCCH or DCI. The allocation, at 1206, of the first set of REs may include allocating samples of symbol(s) in the first set of REs and the allocation, at 1208, of the second set of REs may include allocating samples of symbol(s) in the first set of REs. The allocated samples may be allocated as a number (e.g., one, two, four, or eight) of chunks of samples (e.g., two or four samples). In some aspects, the configuration of the samples for the second set of REs may be allocated in a number of chunks of samples per symbol/RE (e.g., two, four or eight chunks of two or four samples/bits) that may be the same as, or different from, the configured number of chunks (or the size of the chunks) of samples per symbol/RE allocated for the first set of REs. For example, referring to FIG. 5, the UE 502 may configure 508 (1) an allocation of a first set of one or more REs of a PUSCH for at least one PT-RS associated with a first port based on the measured phase noise associated with the first oscillator and (2) an allocation of a second set of one or more REs of a PUSCH for at least one additional PT-RS associated with a second port based on the measured phase noise associated with the second oscillator. For example, referring to FIG. 5, a base station 504 may configure 508 (1) an allocation of a first set of one or more REs of a PDSCH for at least one PT-RS associated with a first port based on the measured phase noise associated with the first oscillator and (2) an allocation of a second set of one or more REs of a PDSCH for at least one additional PT-RS associated with a second port based on the measured phase noise associated with the second oscillator. For example, 1206 and/or 1208 may be performed by a PT-RS RE allocation component 1342 of FIG. 13, or by a PT-RS RE allocation component 1442 of FIG. 14.

In some aspects, the multiple layers included in the PUSCH and/or the PDSCH transmission may be associated with the first local oscillator and the at least one PT-RS is associated with a first layer of the multiple layers. The first layer associated with the at least one PT-RS, in some aspects, may be a strongest layer of the multiple layers included in the PUSCH and/or the PDSCH transmission. In some aspects, the second set of REs may be associated with the at least one additional PT-RS and the at least one additional PT-RS may be associated with a second layer of the multiple-layer single-carrier waveform transmission. The second set of REs (1) may be identical to the first set of REs, (2) may partially overlap with the first set of REs, or (3) may be disjoint from the first set of REs. The second layer associated with the at least one additional PT-RS, in some aspects, may be a strongest layer of multiple layers associated with the second oscillator included in the PUSCH transmission. The strength of the multiple layers may be measured based on a RSRP, a RSRQ, a SNR, or some other relevant measure of signal strength. As was described in relation to FIGS. 6-10, the at least one PT-RS in a first layer and/or the at least one additional PT-RS may overlap in time with one of data, a PT-RS, or a gap (e.g., empty samples) in one or more other layers. For example, the at least one PT-RS associated with the first layer (or the at least one additional PT-RS associated with the second layer) may overlap in time with data for at least one other layer of the multiple layers as described in relation to FIGS. 6-10. The PT-RS in another layer, in some aspects, may be the at least one PT-RS (or the at least one additional PT-RS) transmitted over multiple layers (e.g., the at least one PT-RS (or the at least one additional PT-RS) may be associated with one or more layers of the multiple layers). In some aspects, the PT-RS in another layer may be an independent PT-RS from the at least one PT-RS and may be the at least one additional PT-RS associated with the second oscillator as illustrated in at least diagrams 910, 920, 930, and 940 of FIG. 9. In some aspects, the at least one PT-RS and the at least one additional PT-RS may be time-domain multiplexed such that the at least one PT-RS and the at least one additional PT-RS are non-overlapping in time. In some aspects, the at least one PT-RS and the at least one additional PT-RS may be overlapping in time. The at least one PT-RS and the at least one additional PT-RS, in some aspects, may be spatially multiplexed and/or code-division multiplexed.

The multiple layers included in the PUSCH and/or the PDSCH transmission, in some aspects, are associated with multiple codewords (e.g., codeword 0 410 and codeword 1 412 of FIG. 4) and the at least one PT-RS may be associated with a first codeword of the multiple codewords. In some aspects, the first codeword may be a strongest codeword of the multiple codewords. The strongest codeword may be associated with a highest RSRP, RSRQ, SNR, or some other relevant measure of signal strength. As was described in relation to FIG. 7, the at least one PT-RS associated with a first codeword may overlap in time with one of data, a PT-RS, or a gap (e.g., empty samples) associated with one or more other codewords (e.g., transmitted via one or more layers onto which the other codewords are mapped). For example, the at least one PT-RS associated with the first codeword may overlap in time with data for at least a second codeword of the multiple codewords. The PT-RS associated with another codeword (e.g., associated with another layer onto which the other codeword was mapped), in some aspects, may be a copy of the at least one PT-RS (e.g., the at least one PT-RS is associated with one or more codewords of the multiple codewords). In some aspects, the PT-RS associated with another codeword may be an independent PT-RS from the at least one PT-RS and may be associated with a second oscillator.

At 1210, the UE (or base station) may transmit, to a base station (or a UE), the PUSCH (or PDSCH) including the at least one PT-RS and the at least one additional PT-RS. The at least one PT-RS may be transmitted via the configured allocation of the first set of REs and the at least one additional PT-RS may be transmitted via the configured allocation of the second set of REs. For example, referring to FIG. 5, the UE 502 may transmit, and a base station 504 may receive a multi-layer single carrier waveform 510 including the at least one PT-RS (and the at least one additional PT-RS) via a PUSCH and/or the base station 504 may transmit, and UE 502 may receive, a multi-layer single carrier waveform 516 including at least one PT-RS (and the at least one additional PT-RS) via a PDSCH. For example, 1210 may be performed by PT-RS transmission component 1344 of FIG. 13, or by a PT-RS transmission component 1444 of FIG. 14.

Figure 13:
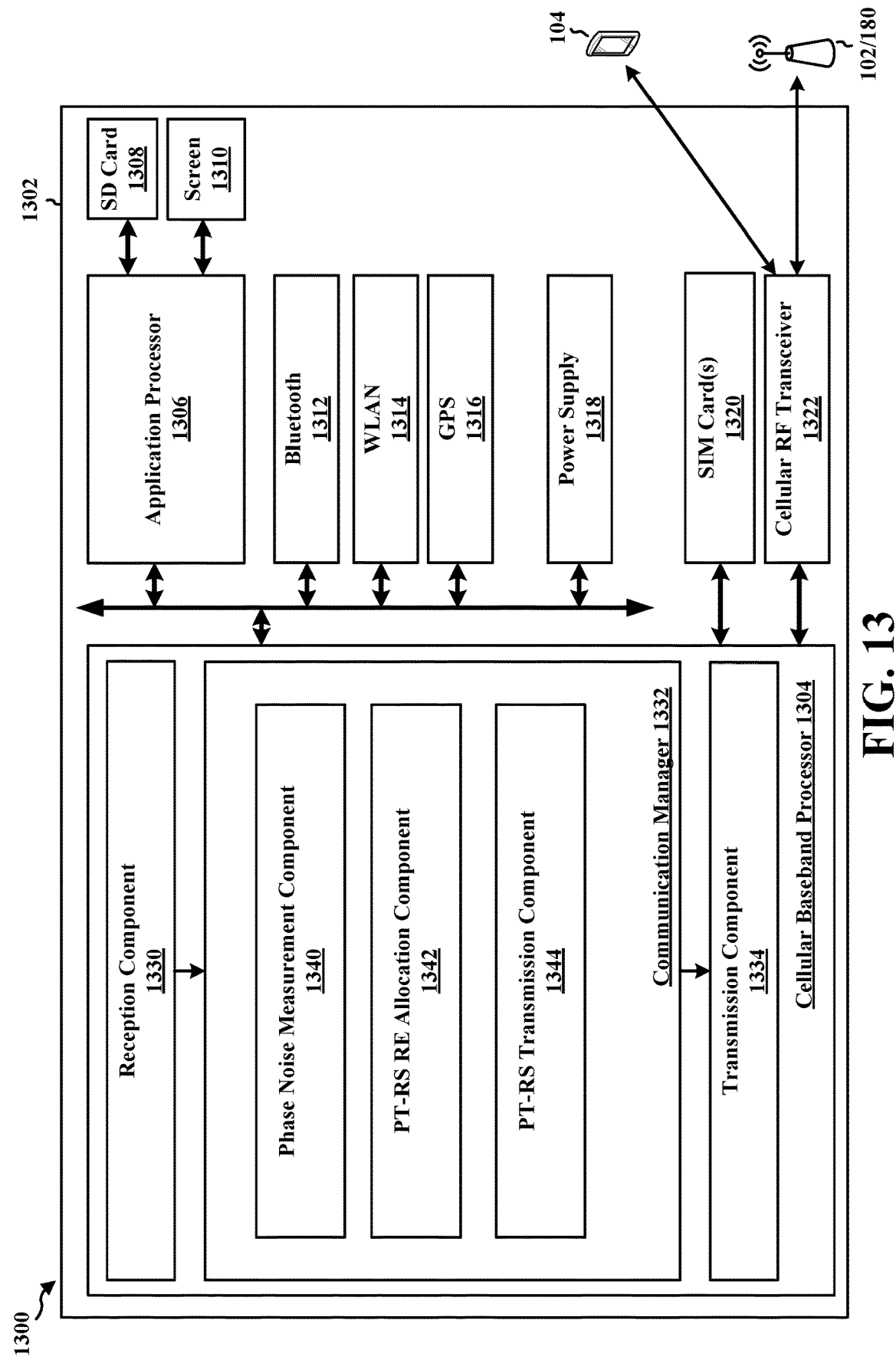
FIG. 13 is a diagram illustrating an example of a hardware implementation for an example apparatus.

FIG. 13 is a diagram 1300 illustrating an example of a hardware implementation for an apparatus 1302. The apparatus 1302 may be a UE, a component of a UE, or may implement UE functionality. In some aspects, the apparatus 1302 may include a cellular baseband processor 1304 (also referred to as a modem) coupled to a cellular RF transceiver 1322. In some aspects, the apparatus 1302 may further include one or more subscriber identity modules (SIM) cards 1320, an application processor 1306 coupled to a secure digital (SD) card 1308 and a screen 1310, a Bluetooth module 1312, a wireless local area network (WLAN) module 1314, a Global Positioning System (GPS) module 1316, or a power supply 1318. The cellular baseband processor 1304 communicates through the cellular RF transceiver 1322 with the UE 104 and/or BS 102/180. The cellular baseband processor 1304 may include a computer-readable medium/memory. The computer-readable medium/memory may be non-transitory. The cellular baseband processor 1304 is responsible for general processing, including the execution of software stored on the computer-readable medium/memory. The software, when executed by the cellular baseband processor 1304, causes the cellular baseband processor 1304 to perform the various functions described supra. The computer-readable medium/memory may also be used for storing data that is manipulated by the cellular baseband processor 1304 when executing software. The cellular baseband processor 1304 further includes a reception component 1330, a communication manager 1332, and a transmission component 1334. The communication manager 1332 includes the one or more illustrated components. The components within the communication manager 1332 may be stored in the computer-readable medium/memory and/or configured as hardware within the cellular baseband processor 1304. The cellular baseband processor 1304 may be a component of the UE 350 and may include the memory 360 and/or at least one of the TX processor 368, the RX processor 356, and the controller/processor 359. In one configuration, the apparatus 1302 may be a modem chip and include just the baseband processor 1304, and in another configuration, the apparatus 1302 may be the entire UE (e.g., see 350 of FIG. 3) and include the additional modules of the apparatus 1302.

The communication manager 1332 includes a phase noise measurement component 1340 that is configured to measure a phase noise of a first (and second) local oscillator associated with a first (and second) port, e.g., as described in connection with 1102 and 1202 of FIGS. 11 and 12. The communication manager 1332 further includes a PT-RS RE allocation component 1342 that receives input in the form of a measured phase noise from the component 1340 and is configured to configure, based on the measured phase noise, (1) an allocation of a first set of REs of a PUSCH for at least one PT-RS associated with the first port and (2) an allocation of a second set of REs of a PUSCH for at least one additional PT-RS associated with the second port, e.g., as described in connection with 1104 and 1204 of FIGS. 11 and 12. The communication manager 1332 further includes a PT-RS transmission component 1344 that receives input in the form of a set of layers including the at least one PT-RS (and the at least one additional PT-RS) from the PT-RS RE allocation component 1342 and is configured to transmit, to a base station, the PUSCH including the at least one PT-RS, e.g., as described in connection with 1106 and 1206 of FIGS. 11 and 12.

The apparatus may include additional components that perform each of the blocks of the algorithm in the flowcharts of FIGS. 11 and 12. As such, each block in the flowcharts of FIGS. 11 and 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1302 may include a variety of components configured for various functions. In one configuration, the apparatus 1302, and in particular the cellular baseband processor 1304, includes means for measuring a phase noise of a first local oscillator associated with a first port. The apparatus 1302, and in particular the cellular baseband processor 1304, may further include means for configuring, based on the measured phase noise, an allocation of a first set of REs of a PUSCH for at least one PT-RS associated with the first port, the first set of REs including multiple layers associated with a multiple-layer single-carrier waveform transmission. The apparatus 1302, and in particular the cellular baseband processor 1304, may further include means for transmitting, to a base station, the PUSCH including the at least one PT-RS, the at least one PT-RS being transmitted via the configured allocation of the first set of REs. The apparatus 1302, and in particular the cellular baseband processor 1304, may further include means for measuring a phase noise of a second local oscillator associated with a second port. The apparatus 1302, and in particular the cellular baseband processor 1304, may further include means for configuring, based on the measured phase noise of the second local oscillator, an allocation of a second set of REs of the PUSCH for at least one additional PT-RS associated with the second port, the second set of REs including the multiple layers associated with the multiple-layer single-carrier waveform transmission. The apparatus 1302, and in particular the cellular baseband processor 1304, may further include means for transmitting, to the base station, the PUSCH including the at least one additional PT-RS, the at least one additional PT-RS being transmitted via the configured allocation of the second set of REs. The means may be one or more of the components of the apparatus 1302 configured to perform the functions recited by the means. As described supra, the apparatus 1302 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 14:
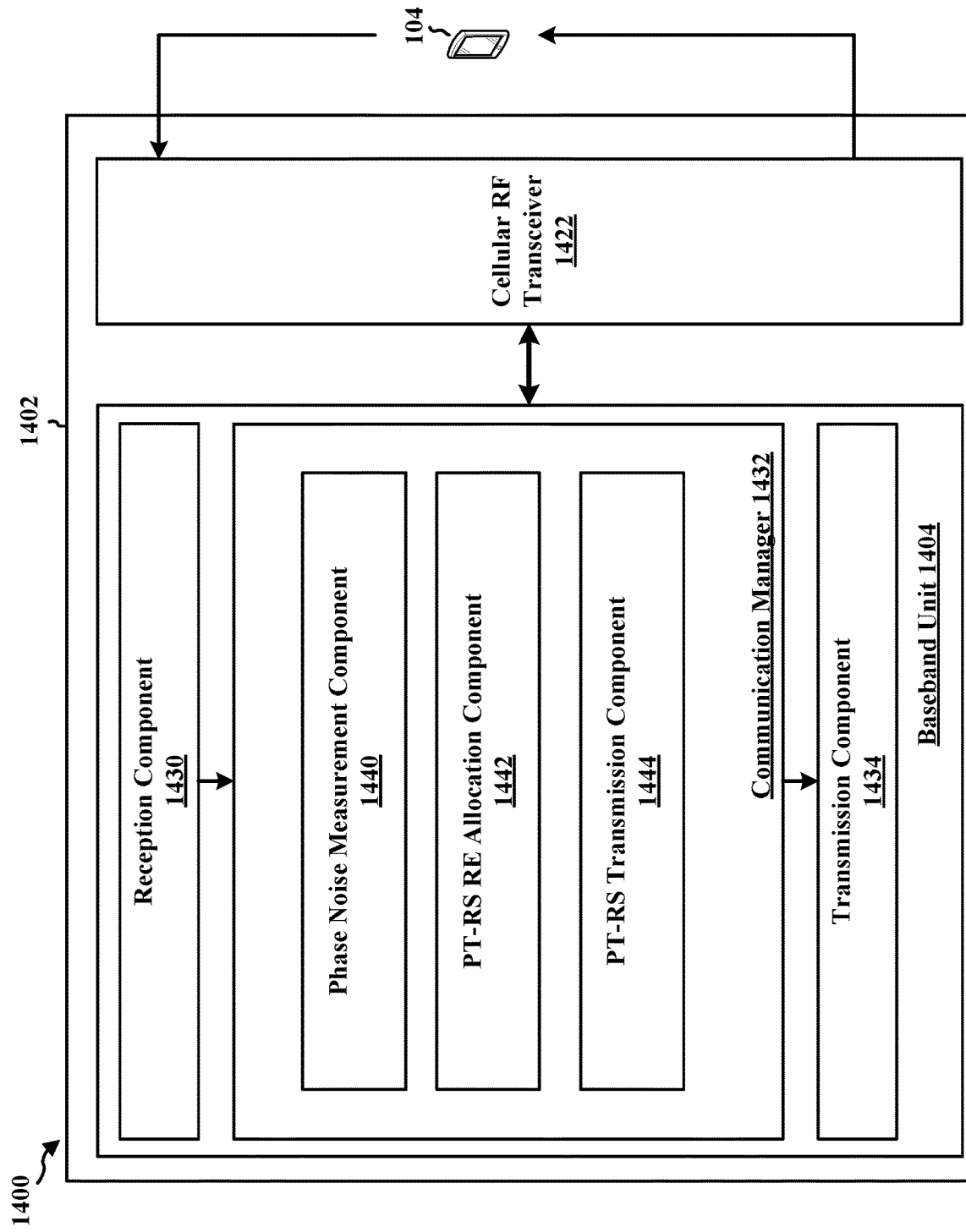
FIG. 14 is a diagram illustrating an example of a hardware implementation for an example apparatus.

FIG. 14 is a diagram 1400 illustrating an example of a hardware implementation for an apparatus 1402. The apparatus 1402 may be a base station, a component of a base station, or may implement base station functionality. In some aspects, the apparatus 1302 may include a baseband unit 1404. The baseband unit 1404 may communicate through a cellular RF transceiver 1422 with the UE 104. The baseband unit 1404 may include a computer-readable medium/memory. The baseband unit 1404 is responsible for general processing, including the execution of software stored on the computer-readable medium/memory. The software, when executed by the baseband unit 1404, causes the baseband unit 1404 to perform the various functions described supra. The computer-readable medium/memory may also be used for storing data that is manipulated by the baseband unit 1404 when executing software. The baseband unit 1404 further includes a reception component 1430, a communication manager 1432, and a transmission component 1434. The communication manager 1432 includes the one or more illustrated components. The components within the communication manager 1432 may be stored in the computer-readable medium/memory and/or configured as hardware within the baseband unit 1404. The baseband unit 1404 may be a component of the base station 310 and may include the memory 376 and/or at least one of the TX processor 316, the RX processor 370, and the controller/processor 375.

The communication manager 1432 includes a phase noise measurement component 1440 that is configured to measure a phase noise of a first (and second) local oscillator associated with a first (and second) port, e.g., as described in connection with 1102 and 1202 of FIGS. 11 and 12. The communication manager 1432 further includes a PT-RS RE allocation component 1442 that receives input in the form of a measured phase noise from the component 1440 and is configured to configure, based on the measured phase noise, (1) an allocation of a first set of REs of a PDSCH for at least one PT-RS associated with the first port and (2) an allocation of a second set of REs of a PDSCH for at least one additional PT-RS associated with the second port, e.g., as described in connection with 1104 and 1204 of FIGS. 11 and 12. The communication manager 1432 further includes a PT-RS transmission component 1444 that receives input in the form of a set of layers including the at least one PT-RS (and the at least one additional PT-RS) from the PT-RS RE allocation component 1442 and is configured to transmit, to a base station, the PDSCH including the at least one PT-RS, e.g., as described in connection with 1106 and 1206 of FIGS. 11 and 12.

The apparatus may include additional components that perform each of the blocks of the algorithm in the flowcharts of FIGS. 11 and 12. As such, each block in the flowcharts of FIGS. 11 and 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1402 may include a variety of components configured for various functions. In one configuration, the apparatus 1402, and in particular the baseband unit 1404, includes means for measuring a phase noise of a first local oscillator associated with a first port. The apparatus 1402, and in particular the baseband unit 1404, may further include means for configuring, based on the measured phase noise, an allocation of a first set of REs of a PDSCH for at least one PT-RS associated with the first port, the first set of REs including multiple layers associated with a multiple-layer single-carrier waveform transmission. The apparatus 1402, and in particular the baseband unit 1404, may further include means for transmitting, to a base station, the PDSCH including the at least one PT-RS, the at least one PT-RS being transmitted via the configured allocation of the first set of REs. The apparatus 1402, and in particular the baseband unit 1404, may further include means for measuring a phase noise of a second local oscillator associated with a second port. The apparatus 1402, and in particular the baseband unit 1404, may further include means for configuring, based on the measured phase noise of the second local oscillator, an allocation of a second set of REs of the PDSCH for at least one additional PT-RS associated with the second port, the second set of REs including the multiple layers associated with the multiple-layer single-carrier waveform transmission. The apparatus 1402, and in particular the baseband unit 1404, may further include means for transmitting, to the base station, the PDSCH including the at least one additional PT-RS, the at least one additional PT-RS being transmitted via the configured allocation of the second set of REs. The means may be one or more of the components of the apparatus 1402 configured to perform the functions recited by the means. As described supra, the apparatus 1402 may include the TX Processor 316, the RX Processor 370, and the controller/processor 375. As such, in one configuration, the means may be the TX Processor 316, the RX Processor 370, and the controller/processor 375 configured to perform the functions recited by the means.

In some aspect of wireless communications, e.g., 5G NR, PT-RS may be used to track and correct phase errors of one or more received symbols (e.g., in mmW systems). Phase errors may be caused by one or more of phase noise, carrier frequency offset, and/or Doppler effect. Phase noise may take the form of rapid random fluctuations in the phase of a waveform that may be caused by jitter of an oscillator in a wireless link. Phase noise may have a large impact on high frequency (e.g., mmW) systems. In some aspects, the large impact of phase noise on high frequency systems may be due to hardware that is less accurate and/or stable compared to lower-frequency systems. In some aspects of wireless communication, for a CP-OFDM waveform, one or two ports may be associated with a PT-RS, while for a single-carrier DFT-s-OFDM waveform, one port may be associated with a PT-RS. As multi-layer and multi-port single-carrier (e.g., DFT-s-OFDM) waveforms may be used for high-frequency systems, there may be benefit to associating multiple layers and/or multiple ports of a single carrier waveform with a PT-RS.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication including at least one processor coupled to a memory and configured to measure a phase noise of a first local oscillator associated with a first port; configure, based on the measured phase noise, an allocation of a first set of REs of a PUSCH for at least one PT-RS associated with the first port, the first set of REs including multiple layers associated with a multiple-layer single-carrier waveform transmission; and transmit, to a base station, the PUSCH including the at least one PT-RS, the at least one PT-RS being transmitted via the configured allocation of the first set of REs.

Aspect 2 is the apparatus of aspect 1, where the phase noise corresponds to at least one of a PUCCH or UCI.

Aspect 3 is the apparatus of any of aspects 1 or 2, where the multiple layers included in the PUSCH transmission are associated with the first local oscillator and the at least one PT-RS is associated with a first layer of the multiple layers.

Aspect 4 is the apparatus of aspect 3, where the first layer is a strongest of the multiple layers.

Aspect 5 is the apparatus of any of aspects 3 or 4, where the at least one PT-RS associated with the first layer overlaps in time with data for at least a second layer of the multiple layers.

Aspect 6 is the apparatus of any of aspects 3 to 5, where the at least one PT-RS is associated with at least a second layer of the multiple layers.

Aspect 7 is the apparatus of any of aspects 1 to 6, where the first local oscillator is associated with each of the multiple layers included in the PUSCH transmission, the multiple layers are associated with multiple codewords, and the at least one PT-RS is associated with a first codeword of the multiple codewords.

Aspect 8 is the apparatus of aspect 7, where the first codeword is a strongest codeword of the multiple codewords.

Aspect 9 is the apparatus of any of aspects 7 or 8, where the at least one PT-RS associated with the first codeword overlaps in time with data for at least a second codeword of the multiple codewords.

Aspect 10 is the apparatus of any of aspects 7 to 9, where the at least one PT-RS is associated with two or more codewords of the multiple codewords.

Aspect 11 is the apparatus of any of aspects 1 to 10 the at least one processor is further configured to measure a phase noise of a second local oscillator associated with a second port; configure, based on the measured phase noise of the second local oscillator, an allocation of a second set of REs of the PUSCH for at least one additional PT-RS associated with the second port, the second set of REs including the multiple layers associated with the multiple-layer single-carrier waveform transmission; and transmit, to the base station, the PUSCH including the at least one additional PT-RS, the at least one additional PT-RS being transmitted via the configured allocation of the second set of REs.

Aspect 12 is the apparatus of aspect 11, where the first set of REs is associated with the at least one PT-RS, the at least one PT-RS being associated with a first layer of the multiple-layer single-carrier waveform transmission, and the second set of REs is associated with the at least one additional PT-RS, the at least one additional PT-RS being associated with a second layer of the multiple-layer single-carrier waveform transmission.

Aspect 13 is the apparatus of aspect 12, where the at least one PT-RS and the at least one additional PT-RS are time-domain multiplexed such that the at least one PT-RS and the at least one additional PT-RS are non-overlapping in time.

Aspect 14 is the apparatus of aspect 13, where the at least one PT-RS overlaps in time with data associated with the second layer and the at least one additional PT-RS overlaps in time with data associated with the first layer.

Aspect 15 is the apparatus of aspect 12, where the at least one PT-RS associated with the first layer and the at least one additional PT-RS associated with the second layer are overlapping in time.

Aspect 16 is the apparatus of aspect 15, where the transmission associated with the first layer and the transmission associated with the second layer are at least one of (1) spatially multiplexed or (2) code division multiplexed.

Aspect 17 is the apparatus of any of aspects 11 to 16, where a first configuration of PT-RS samples for the at least one PT-RS associated with the first layer is different from a second configuration of PT-RS samples for the at least one additional PT-RS associated with the second layer.

Aspect 18 is the apparatus of any of aspects 1 to 17, further including a transceiver coupled to the at least one processor.

Aspect 19 is an apparatus for wireless communication including at least one processor coupled to a memory and configured to measure a phase noise of a first local oscillator associated with a first port; configure, based on the measured phase noise, an allocation of a first set of REs of a PDSCH for at least one PT-RS associated with the first port, the first set of REs including multiple layers associated with a multiple-layer single-carrier waveform transmission; and transmit, to a UE, the PDSCH including the at least one PT-RS, the at least one PT-RS being transmitted via the configured allocation of the first set of REs.

Aspect 20 is the apparatus of aspect 19, where the phase noise corresponds to at least one of a PDCCH or DCI.

Aspect 21 is the apparatus of any of aspects 19 and 20, where the multiple layers included in the PDSCH transmission are associated with the first local oscillator and the at least one PT-RS is associated with a first layer of the multiple layers, where the first layer is a strongest layer of the multiple layers.

Aspect 22 is the apparatus of aspect 21, where the at least one PT-RS associated with the first layer overlaps in time with data for at least a second layer of the multiple layers.

Aspect 23 is the apparatus of any of aspects 19 to 22, where the first local oscillator is associated with each of the multiple layers included in the PDSCH transmission, the multiple layers are associated with multiple codewords, and the at least one PT-RS is associated with a first codeword of the multiple codewords, where the first codeword is a strongest codeword of the multiple codewords.

Aspect 24 is the apparatus of aspect 23, where the at least one PT-RS associated with the first codeword overlaps in time with data for at least a second codeword of the multiple codewords.

Aspect 25 is the apparatus of aspect 24, where the at least one PT-RS is associated with two or more codewords of the multiple codewords.

Aspect 26 is the apparatus of any of aspects 19 to 22, the at least one processor is further configured to measure a phase noise of a second local oscillator associated with a second port; configure, based on the measured phase noise of the second local oscillator, an allocation of a second set of REs of the PDSCH for at least one additional PT-RS associated with the second port, the second set of REs including the multiple layers associated with the multiple-layer single-carrier waveform transmission; and transmit, to the base station, the PDSCH including the at least one additional PT-RS, the at least one additional PT-RS being transmitted via the configured allocation of the second set of REs.

Aspect 27 is the apparatus of aspect 26, where the first set of REs is associated with the at least one PT-RS, the at least one PT-RS being associated with a first layer of the multiple-layer single-carrier waveform transmission, and the second set of REs is associated with the at least one additional PT-RS, the at least one additional PT-RS being associated with a second layer of the multiple-layer single-carrier waveform transmission, where the at least one PT-RS and the at least one additional PT-RS are time-domain multiplexed such that the at least one PT-RS and the at least one additional PT-RS are non-overlapping in time.

Aspect 28 is the apparatus of aspect 27, where a first configuration of PT-RS samples for the at least one PT-RS associated with the first layer is different from a second configuration of PT-RS samples for the at least one additional PT-RS associated with the second layer.

Aspect 29 is the apparatus of any of aspects 19 to 28, further including a transceiver coupled to the at least one processor.

Aspect 30 is a method of wireless communication for implementing any of aspects 1 to 29.

Aspect 31 is an apparatus for wireless communication including means for implementing any of aspects 1 to 29.

Aspect 32 is a computer-readable medium storing computer executable code, where the code when executed by a processor causes the processor to implement any of aspects 1 to 29.

What is claimed is:

1. An apparatus for wireless communication at a user equipment (UE), comprising:
   a memory; and
   at least one processor coupled to the memory and configured to:
      measure a phase noise of a first local oscillator associated with a first port;
      configure, based on the measured phase noise, an allocation of a first set of resource elements (REs) of a physical uplink shared channel (PUSCH) for at least one phase tracking reference signal (PT-RS) associated with the first port, wherein the first set of REs is associated with a multiple-layer single-carrier waveform transmission including a plurality of layers associated with a plurality of codewords, wherein the first local oscillator is associated with a first set of two or more layers of the multiple-layer single-carrier waveform transmission, and wherein the at least one PT-RS is associated with a first codeword in the plurality of codewords; and
      transmit, to a base station, the at least one PT-RS via the PUSCH based on the configured allocation of the first set of REs.

2. The apparatus of claim 1, wherein the phase noise corresponds to at least one of a physical uplink control channel (PUCCH) or uplink control information (UCI).

3. The apparatus of claim 1, wherein the plurality of layers included in the PUSCH is associated with the first local oscillator and the at least one PT-RS is associated with a first layer in the plurality of layers.

4. The apparatus of claim 3, wherein the first layer is a strongest layer in the plurality of layers.

5. The apparatus of claim 3, wherein the at least one PT-RS associated with the first layer overlaps in time and frequency with data for at least a second layer in the plurality of layers.

6. The apparatus of claim 3, wherein the at least one PT-RS is associated with at least a second layer in the plurality of layers.

7. The apparatus of claim 1, wherein the first codeword is a strongest codeword in the plurality of codewords.

8. The apparatus of claim 1, wherein the at least one PT-RS associated with the first codeword overlaps in time with data for at least a second codeword in the plurality of codewords.

9. The apparatus of claim 1, wherein the at least one PT-RS is associated with two or more codewords in the plurality of codewords.

10. The apparatus of claim 1, the at least one processor further configured to:
    measure a second phase noise of a second local oscillator associated with a second port;
    configure, based on the measured second phase noise of the second local oscillator, an additional allocation of a second set of REs of the PUSCH for at least one additional PT-RS associated with the second port, wherein the second set of REs is associated with the multiple-layer single-carrier waveform transmission including the plurality of layers, and wherein the second local oscillator is associated with a second set of two or more layers of the plurality of layers of the multiple-layer single-carrier waveform transmission; and
    transmit, to the base station, the at least one additional PT-RS via the PUSCH based on the configured additional allocation of the second set of REs.

11. The apparatus of claim 10, wherein:
    the first set of REs is associated with the at least one PT-RS, the at least one PT-RS being associated with a first layer in the first set of two or more layers of the multiple-layer single-carrier waveform transmission, and
    the second set of REs is associated with the at least one additional PT-RS, the at least one additional PT-RS being associated with a second layer in the second set of two or more layers of the multiple-layer single-carrier waveform transmission.

12. The apparatus of claim 11, wherein the at least one PT-RS and the at least one additional PT-RS are time-domain multiplexed such that the at least one PT-RS and the at least one additional PT-RS are non-overlapping in time.

13. The apparatus of claim 12, wherein the at least one PT-RS overlaps in time with data associated with the second layer and the at least one additional PT-RS overlaps in time with data associated with the first layer.

14. The apparatus of claim 11, wherein the at least one PT-RS associated with the first layer and the at least one additional PT-RS associated with the second layer are overlapping in time.

15. The apparatus of claim 14, wherein the at least one PT-RS associated with the first layer and the at least one additional PT-RS associated with the second layer are at least one of (1) spatially multiplexed or (2) code division multiplexed.

16. The apparatus of claim 11, wherein a first configuration of PT-RS samples for the at least one PT-RS associated with the first layer is different from a second configuration of PT-RS samples for the at least one additional PT-RS associated with the second layer.

17. The apparatus of claim 1, further comprising a transceiver coupled to the at least one processor.

18. An apparatus for wireless communication at a base station, comprising:
a memory; and
at least one processor coupled to the memory and configured to:
measure a phase noise of a first local oscillator associated with a first port;
configure, based on the measured phase noise, an allocation of a first set of resource elements (REs) of a physical downlink shared channel (PDSCH) for at least one phase tracking reference signal (PT-RS) associated with the first port, wherein the first set of REs is associated with a multiple-layer single-carrier waveform transmission including a plurality of layers associated with a plurality of codewords, wherein the first local oscillator is associated with a first set of two or more layers of the multiple-layer single-carrier waveform transmission, and wherein the at least one PT-RS is associated with a first codeword in the plurality of codewords; and
transmit, to a user equipment (UE), the at least one PT-RS via the PDSCH based on the configured allocation of the first set of REs.

19. The apparatus of claim 18, wherein the phase noise corresponds to at least one of a physical downlink control channel (PDCCH) or downlink control information (DCI).

20. The apparatus of claim 18, wherein the plurality of layers included in the PDSCH is associated with the first local oscillator and the at least one PT-RS is associated with a first layer in the plurality of layers, wherein the first layer is a strongest layer in the plurality of layers.

21. The apparatus of claim 20, wherein the at least one PT-RS associated with the first layer overlaps in time and frequency with data for at least a second layer in the plurality of layers.

22. The apparatus of claim 18, wherein the at least one PT-RS associated with the first codeword overlaps in time with data for at least a second codeword in the plurality of codewords.

23. The apparatus of claim 18, wherein the at least one PT-RS is associated with two or more codewords in the plurality of codewords.

24. The apparatus of claim 18, the at least one processor further configured to:
measure a second phase noise of a second local oscillator associated with a second port;
configure, based on the measured second phase noise of the second local oscillator, an additional allocation of a second set of REs of the PDSCH for at least one additional PT-RS associated with the second port, wherein the second set of REs is associated with the multiple-layer single-carrier waveform transmission including the plurality of layers, and wherein the second local oscillator is associated with a second set of two or more layers of the plurality of layers of the multiple-layer single-carrier waveform transmission; and
transmit, to the base station, the at least one additional PT-RS via the PDSCH based on the configured additional allocation of the second set of REs.

25. The apparatus of claim 24, wherein:
the first set of REs is associated with the at least one PT-RS, the at least one PT-RS being associated with a first layer in the first set of two or more layers of the multiple-layer single-carrier waveform transmission, and
the second set of REs is associated with the at least one additional PT-RS, the at least one additional PT-RS being associated with a second layer in the second set of two or more layers of the multiple-layer single-carrier waveform transmission, wherein the at least one PT-RS and the at least one additional PT-RS are time-domain multiplexed such that the at least one PT-RS and the at least one additional PT-RS are non-overlapping in time.

26. The apparatus of claim 25, further comprising a transceiver coupled to the at least one processor, wherein a first configuration of PT-RS samples for the at least one PT-RS associated with the first layer is different from a second configuration of PT-RS samples for the at least one additional PT-RS associated with the second layer.

27. A method of wireless communication at a user equipment (UE), comprising:
measuring a phase noise of a first local oscillator associated with a first port;
configuring, based on the measured phase noise, an allocation of a first set of resource elements (REs) of a physical uplink shared channel (PUSCH) for at least one phase tracking reference signal (PT-RS) associated with the first port, wherein the first set of REs is associated with a multiple-layer single-carrier waveform transmission including a plurality of layers associated with a plurality of codewords, wherein the first local oscillator is associated with a first set of two or more layers of the multiple-layer single-carrier waveform transmission, and wherein the at least one PT-RS is associated with a first codeword in the plurality of codewords; and
transmitting, to a base station, the at least one PT-RS via the PUSCH based on the configured allocation of the first set of REs.

28. A method of wireless communication at a base station, comprising:
measuring a phase noise of a first local oscillator associated with a first port;

configuring, based on the measured phase noise, an allocation of a first set of resource elements (REs) of a physical downlink shared channel (PDSCH) for at least one phase tracking reference signal (PT-RS) associated with the first port, wherein the first set of REs is associated with a multiple-layer single-carrier waveform transmission including a plurality of layers associated with a plurality of codewords, wherein the first local oscillator is associated with a first set of two or more layers of the multiple-layer single-carrier waveform transmission, and wherein the at least one PT-RS is associated with a first codeword in the plurality of codewords; and transmitting, to a user equipment (UE), the at least one PT-RS via the PDSCH based on the configured allocation of the first set of REs.

\* \* \* \* \*